US009785883B2

(12) United States Patent
LuVogt et al.

(10) Patent No.: US 9,785,883 B2
(45) Date of Patent: Oct. 10, 2017

(54) AVATARS FOR USE WITH PERSONALIZED GENERALIZED CONTENT RECOMMENDATIONS

(75) Inventors: Chris LuVogt, Santa Clara, CA (US); Vu B. Nguyen, San Francisco, CA (US); Brian Theodore, Los Altos, CA (US); Ketan Bhatia, San Francisco, CA (US); Justine Shen, San Jose, CA (US); Deepa Mahalingam, San Jose, CA (US)

(73) Assignee: EXCALIBUR IP, LLC, New York, NY (US)

( * ) Notice: Subject to any disclaimer, the term of this patent is extended or adjusted under 35 U.S.C. 154(b) by 610 days.

(21) Appl. No.: 13/459,009

(22) Filed: Apr. 27, 2012

(65) Prior Publication Data
US 2013/0290905 A1    Oct. 31, 2013

(51) Int. Cl.
*G06Q 30/02* (2012.01)
*G06N 3/00* (2006.01)

(52) U.S. Cl.
CPC ................... *G06N 3/006* (2013.01)

(58) Field of Classification Search
CPC .............. G06Q 30/02; G06F 3/0481
USPC ...... 705/14.71, 14.55, 14.67, 14.73; 715/835
See application file for complete search history.

(56) References Cited

U.S. PATENT DOCUMENTS

| | | |
|---|---|---|
| 5,724,567 A | 3/1998 | Rose et al. |
| 6,493,702 B1 | 12/2002 | Adar et al. |
| 6,564,202 B1 | 5/2003 | Schuetze et al. |
| 7,468,729 B1 * | 12/2008 | Levinson ..................... 345/473 |
| 7,567,958 B1 | 7/2009 | Alspector et al. |
| 8,321,278 B2 | 11/2012 | Haveliwala et al. |
| 8,515,336 B2 | 8/2013 | Collins et al. |
| 8,612,866 B2 | 12/2013 | Miyazaki et al. |
| 2002/0016786 A1 | 2/2002 | Pitkow et al. |
| 2003/0033287 A1 | 2/2003 | Shanahan et al. |
| 2003/0033288 A1 | 2/2003 | Shanahan et al. |
| 2003/0061200 A1 | 3/2003 | Hubert et al. |
| 2003/0061201 A1 | 3/2003 | Grefenstette et al. |
| 2003/0069877 A1 | 4/2003 | Grefenstette et al. |
| 2003/0074368 A1 | 4/2003 | Schuetze et al. |
| 2003/0074369 A1 | 4/2003 | Schuetze et al. |
| 2003/0110181 A1 | 6/2003 | Schuetze et al. |
| 2003/0120634 A1 | 6/2003 | Koike et al. |
| 2004/0044565 A1 | 3/2004 | Kumar et al. |
| 2004/0205448 A1 | 10/2004 | Grefenstette et al. |
| 2005/0022114 A1 | 1/2005 | Shanahan et al. |
| 2006/0080314 A1 | 4/2006 | Hubert et al. |
| 2007/0271287 A1 | 11/2007 | Acharya et al. |

(Continued)

*Primary Examiner* — Sun Li
(74) *Attorney, Agent, or Firm* — James J. DeCarlo; Greenberg Traurig, LLP

(57) ABSTRACT

Users receive content recommendations from a personalized, generalized recommendation service that aggregates and selects content of high personal relevance to each individual user from a large pool of both personal and public content. The received content is filtered and the content determined to be relevant is cached. When a user request for content is received, the cached content is rescored and the content determined to be most relevant based on satisfaction of a relevance threshold is selected and forwarded to the user. Feedback methodologies are also implemented so that a user's actions are taken into consideration in real time and can affect subsequent recommendations to the user.

18 Claims, 27 Drawing Sheets

(56) References Cited

U.S. PATENT DOCUMENTS

| | | |
|---|---|---|
| 2008/0005651 A1 | 1/2008 | Grefenstette et al. |
| 2008/0010122 A1* | 1/2008 | Dunmire et al. ............... 705/14 |
| 2008/0090513 A1 | 4/2008 | Collins et al. |
| 2009/0144635 A1 | 6/2009 | Miyazaki et al. |
| 2009/0234825 A1 | 9/2009 | Xia et al. |
| 2009/0248599 A1 | 10/2009 | Hueter et al. |
| 2009/0259606 A1 | 10/2009 | Seah |
| 2010/0050078 A1* | 2/2010 | Refuah et al. ................ 715/706 |
| 2010/0145797 A1* | 6/2010 | Hamilton et al. ......... 705/14.49 |
| 2010/0153440 A1 | 6/2010 | Hubert |
| 2010/0169910 A1 | 7/2010 | Collins et al. |
| 2010/0228715 A1 | 9/2010 | Lawrence |
| 2010/0250547 A1 | 9/2010 | Grefenstette et al. |
| 2010/0293057 A1 | 11/2010 | Haveliwala et al. |
| 2011/0029464 A1 | 2/2011 | Zhang et al. |
| 2011/0093458 A1 | 4/2011 | Zheng et al. |
| 2012/0054040 A1 | 3/2012 | Bagherjeiran et al. |
| 2012/0066234 A1 | 3/2012 | Lee et al. |
| 2012/0254188 A1 | 10/2012 | Koperski et al. |
| 2012/0310938 A1 | 12/2012 | Kami |
| 2013/0073568 A1 | 3/2013 | Federov et al. |
| 2013/0290110 A1 | 10/2013 | LuVogt et al. |
| 2013/0290339 A1 | 10/2013 | LuVogt et al. |

* cited by examiner

FIG. 16

| Gimme | Y! 10 Things | Edit |

☐ A message from tkin:
(9 of 11): Getting too many items about the same thing? Try adding terms to your "avoid" list using the training icon or Settings tab
1602

Y! 0 seconds ago
1630

☐ A message from tkin:
(8 of 12): Some words are highlighted because you have added them to your standing searches. Don't like one? Click on the Settings screen to let me know
1620

Y! 7:14 pm 0.1.18.38

☐ Mathew DeMarco:
But... wait a second. That would indicate that a significant arm of the mass media elite isn't at all representative of the American population
1650 at large... Please tell me this is another glaring in ...

4:24 pm 07.29.17 Comments (3)
1640

☐ A message from tkin:
(7 of 12): You can think of the keywords you enter on the Settings screen as standing search queries - I will always be on the lookout for items with those words
1610

| 10 Things Latest | Saved | Settings |

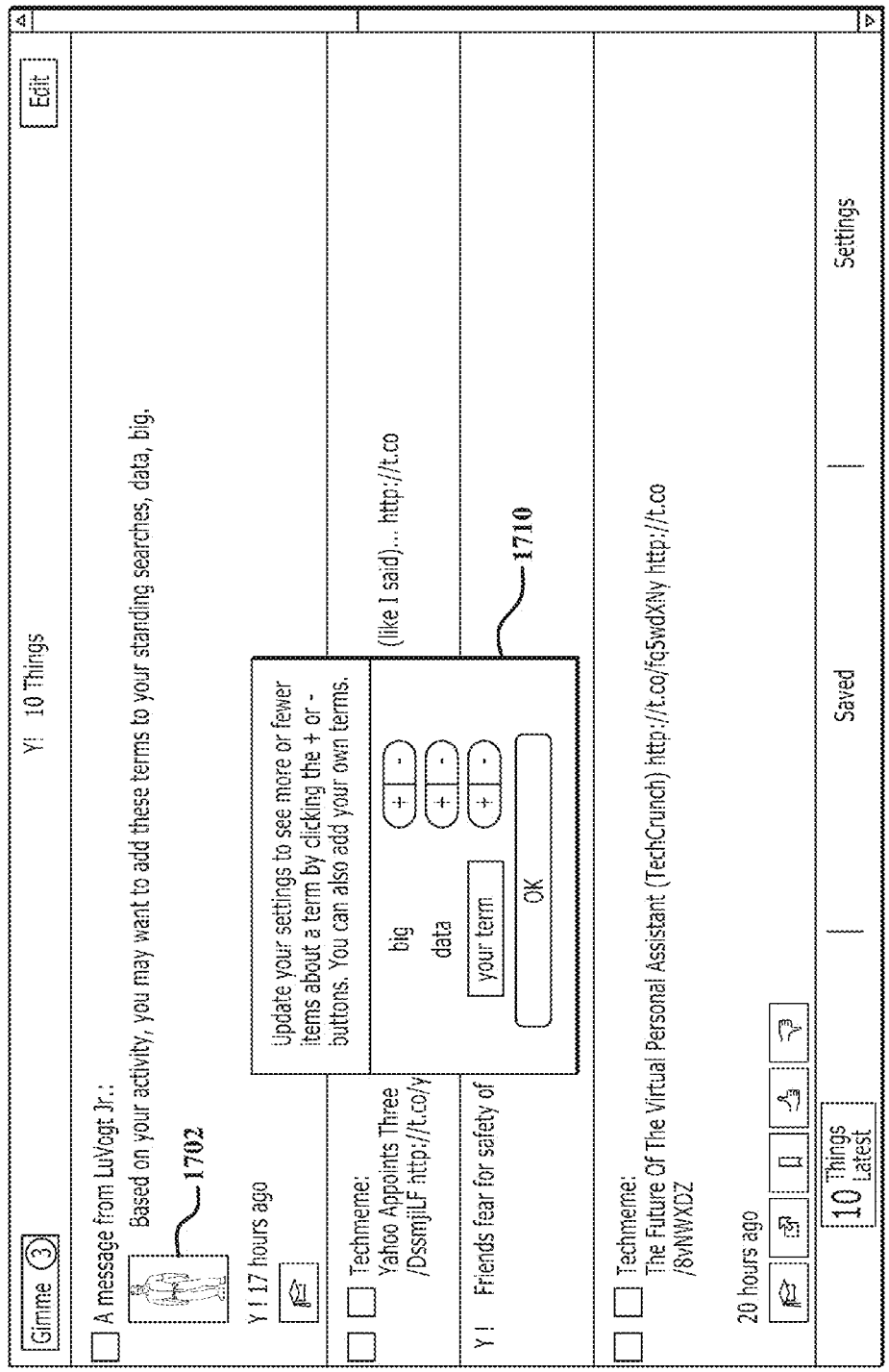

FIG. 19

AVATARS FOR USE WITH PERSONALIZED GENERALIZED CONTENT RECOMMENDATIONS

The present disclosure relates to personalized, generalized content recommendation systems and methods.

BACKGROUND

The ubiquitous presence of the Internet in the modern era has placed the world of information and entertainment at our finger tips. Users can access vast resources of infotainment at any time with nearly minimum effort so that almost any need for information can be instantly answered. In view of the vast resources available and the busy life styles, the users' attention is highly fragmented between disparate information sources so that it is difficult for any one information source to hold the user's attention for a considerable time period.

SUMMARY

This disclosure provides for personalized, generalized recommendation systems and methodologies that facilitate determining relevance and recommending relevant content selected from different public and private data. In one embodiment a method of providing content recommendations is disclosed. This method includes receiving, at a processor, a plurality of content items obtained from content streams of different content types to be forwarded to at least one user. In an embodiment, the content streams of different content types are received from multiple content sources. Attributes of the received content items are obtained and content items to be forwarded to the user are obtained based on the attributes. In an embodiment, the content items determined to be relevant based on the attributes are forwarded to a user model associated with the user. The content items forwarded to the user model are scored and content items determined to be relevant based on the score are added to the lists of unseen content items. At least a first subset of the scored content items are added to respective lists of unseen content items for the user based at least on the type of content in each content item of the subset. When a request is received from the user for relevant unseen content items, the first subset of content items are rescored based on a current context of the user. Top scoring content items are selected from the first subset of content items and forwarded to the user. In an embodiment, a user selection of a content item from the selected top scoring content items is received by the processor that recalculates the relevance of the user selected content item to user models of other users on receiving the user selection.

In another embodiment, a computing device, comprising a processor and a storage medium for tangibly storing thereon programming logic associated with the personalized, generalized, recommendation system, for execution by the processor, is disclosed. The programming logic comprises content item receiving logic, executed by the processor, for receiving a plurality of content items obtained from content streams of different content types to be forwarded to at least one user. Scoring logic is executed by the processor, for scoring at least a subset of the plurality of content items. Adding logic, executed by the processor, adds at least a first subset of the scored content items to respective lists of unseen content items for the user based at least on the type of content in each content item of the subset. User request receiving logic, executed by the processor, configures the processor to receive a request from the user for relevant unseen content items. The first subset of content items are rescored based on a current context of the user upon receiving the user request by rescoring logic, executed by the processor. Selecting logic, executed by the processor, selects top scoring content items from the first subset of content items and the selected top scoring content items are forwarded to the user in response to the user request for the relevant items by forwarding logic, executed by the processor.

A computer readable storage medium, having stored thereon, instructions for execution by a processor is disclosed in accordance with another embodiment. The instructions cause the processor to receive a plurality of content items obtained from content streams of different content types to be forwarded to at least one user and score at least a subset of the received content items. The instructions further cause the processor to add at least a first subset of the scored content items to respective lists of unseen content items for the user based at least on the type of content in each content item of the subset. When a user request for relevant unseen content items is received, the instructions further cause the processor to rescore the first subset of content items based on a current context of the user. In addition, the instructions also comprise instructions that configure the processor to select top scoring content items from the first subset of content items and forward the selected top scoring content items to the user in response to the user request.

In one embodiment, a method of providing content is disclosed. The method comprises receiving, at a processor, a request from a user for a predetermined number of unseen content items relevant to the current user context and transmitting, by the processor, the user request to a recommendation server. A list of seen content items is obtained by the processor in response to the user request, and displayed on a display device. The list of seen content items comprises unseen content items relevant to the current user context. In one embodiment, a combination of the list of seen content items and at least one content item displayed prior to receiving the list of seen content items can be displayed.

In an embodiment, a method of generating a user model in terms of categories of interest to the user and providing recommendations based on such a user model is disclosed. The method commences with a processor receiving, a user request for content recommendations along with information regarding the user which can comprise at least a subset of content sources from which the user desires content recommendations. In an embodiment, the information regarding the user can also comprise information associated with prior user activity, such as, previous user searches, selections of content or prior user feedback. Based on such user information, a plurality of categories are provided for selection to the user. The user selections of categories are received and the respective category vectors of the user selected categories are aggregated. A user model representing the user's interests which is employed in making relevant content item recommendations is generated from the aggregated category vectors in combination with vector representations of the user information. In an embodiment, keywords, entities, content item features and other user information can be represented as vectors which are combined with the aggregated category vectors to generate the user model. Based on a determination of relevance by the user model, content recommendations are forwarded to the user. In one embodiment the recommended content items are selected from the subset of content sources wherein each content source provides a respective content type different from other sources.

In one embodiment, the user model is updated based on a user selection of a recommended content item. This can trigger discovery of new content and consequently new content recommendations. In an embodiment, such updates to user model in response to user selections and recommendations of new content can occur in real time. Hence, in response to a user selection of a particular content item, updated recommendations of content items can be transmitted to the user. Such updated recommendations of content items can comprise recommendations for new content items identified by the processor as being relevant to the user in accordance with the updated user model. In an embodiment, updated recommendations of content items can be based on updates to other user models that are similar to the generated user model. In an embodiment, updated recommendations of content items can be based on updates to the category vectors included in the user model.

In an embodiment the user model can be updated on a periodic basis, for example, on a daily basis. User vectors associated with the user model over the preceding 'N' days are obtained, N being a natural number, for example, thirty. In a further embodiment, the user vectors of the preceding thirty days are obtained and are weighed by a function of the number of days back and aggregated to generate an aggregated user vector. Current category vectors of the respective categories are combined with the aggregated user vector to generate an updated user vector for the day.

In one embodiment, the user model parameters such as relevance threshold are adjusted based on user behavior and/or system response. In one embodiment, the number of times that a user requests new content is recorded. If the user requests new content frequently, a relevance threshold associated with determination of relevance for providing the recommendations is lowered, such that more content items can be recommended. Conversely, if the user requests new content less frequently, the relevance threshold is increased such that fewer relevant content items can be recommended. In one embodiment, types of content requested by the user can be stored and the user model can be updated such that a greater number of category vectors are aggregated within the user model if the user is requesting greater variety of content or content of different content types.

In one embodiment, a computing device for generating a user model in terms categories of interest to the user and providing recommendations based on such a user model is disclosed. The computing device comprises a processor and a storage medium for tangibly storing thereon program logic for execution by the processor. The program logic when executed by the processor, causes the processor to receive a user request for content recommendations in addition to receiving information regarding the user comprising at least a subset of content sources from which the user desires content recommendations. The processor also executes logic for providing categories for selection by the user and logic for receiving category selections made by the user. Aggregating logic, executed by the processor, aggregates category vectors of respective categories selected by the user. A user model representing the user's interests is generated by the generating logic executed by the processor which generates the user model by combining the aggregated category vectors with vector representations of the user information. Recommendations providing logic is executed by the processor, for providing recommendations of content items to the user based on the user model. In one embodiment, the recommendations providing logic further comprises, logic for selecting the recommended content items from the subset of content sources, wherein each content source provides a respective content type different from other sources. The processor also executes logic for receiving user selection of at least one recommended content item and updating logic, for updating the user model based on the user selection. In addition, the processor also executes logic for updating the recommendations of content items based on the updated user model and transmitting the updated recommendations of content items to the user in real-time.

In one embodiment, the processor also executes logic for providing, updated recommendations of content items based on updates to other user models that are similar to the generated user model. In an embodiment, the processor executes logic for providing updated recommendations of content items based on updates to the category vectors included in the user model. In an embodiment, the processor executes logic for updating the user model on a periodic basis by obtaining, user vectors associated with the user model over prior 'N' days, N being a natural number, aggregating, the user vectors of the preceding days weighed by a function of the number of days back to generate an aggregated user vector and by combining, current category vectors of the respective categories with the aggregated user vector to generate an updated user vector.

In an embodiment, the processor executes storing logic, for storing frequency of user requests for new content so that the processor can lower a relevance threshold associated with determination of relevance for providing the recommendations such that more content items can be recommended if the user request new content frequently. Conversely, the processor can increase the relevance threshold such that fewer relevant content items can be recommended if the user requests new content infrequently. In an embodiment, the processor executes logic for storing types of content requested by the user and updating, the user model such that a greater number of category vectors are aggregated within the user model.

In an embodiment, the processor executes explicit training logic, for receiving terms from the user for explicitly adding to or deleting from the user model and item weighing logic, for respectively weighing favorably and unfavorably content items comprising the received terms when providing the recommendations. Additionally, the processor also executes training logic, for suggesting terms from the content items to the user for adding to the user model and/or for content searches that may be issued by the user. In an embodiment, the processor executes user model comparison logic, for comparing the user model to a disparate user model of a second user. Contact suggestion logic, executed by the processor, suggests the second user as a contact to the user based on a similarity of the user model to the disparate user model of the second user as determined by the user model comparison logic. For example, the contact suggestion logic can be activated by the processor, based on the similarity between the two user models crossing a predetermined threshold value.

In one embodiment, a computer readable storage medium, having stored thereon, instructions which when executed by a processor, cause the processor to provide relevant content recommendations is disclosed. These include instructions that cause the processor to receive, a user request for content recommendations in addition to information regarding the user comprising at least a subset of content sources from which the user desires content recommendations. The instructions cause the processor to provide categories for selection by the user and receive, category selections made by the user. The instructions further include those that cause the processor to aggregate category vectors of respective categories selected by the user and generate a user model representing the user's interests. In an embodiment, the user model is generated from the aggregated category vectors in combination with vector representations of the user information and recommendations of content items to the user are based on the user model. In an embodiment, the user information can include information associated with user activity prior to generation of the user model. In an embodiment, the computer readable medium also includes instructions to select the recommended content items from the subset of content sources, each content source providing a respective content type different from other sources of the subset of content sources. In one embodiment, the computer readable storage medium, further comprises instructions to store the recommended content items in a data storage and generate an index on the stored content items that facilitates later user retrieval of the stored content items from the data storage. Relevant content items are retrieved from the stored content items in response to a user query and ranked based on prior user actions associated therewith. The ranked content items are transmitted in response to the user query.

A method for providing content recommendations is disclosed in accordance with one embodiment. The method comprises, receiving, at a processor, a user request for content recommendations. A plurality of content categories for user selection are provided, by the processor. At least a subset of the categories selected by the user are received and based at least on such user selected categories a subset of avatars are generated for further selection by the user. Upon receiving a user selection of an avatar from the subset of avatars, the user selected avatar is associated with a respective user model of the user. The user model can be customized by exchanging communication with the user via the avatar. In an embodiment, the user model can be customized by receiving search terms for whitelisting from the user via exchange of messages between the user and the avatar and generating, standing search queries for each of the whitelisted terms. User feedback to content retrieved via the standing search queries can be monitored and contextual messages can be provided to the user via the avatar based on the user feedback. The standing search queries are updated based on user response to the contextual messages. In an embodiment, a health of the avatar is indicated based at least on interaction of the user with the user model wherein the health of the avatar is indicated by the processor via a color of the avatar, via an expression of the avatar or some other visual representation. In an embodiment, a sentiment of a content item is indicated via an expression of the avatar. In an embodiment, an indication of personalized content can be indicated via a rendering of the avatar.

A computing device comprising a processor and a storage medium for tangibly storing thereon program logic for execution by the processor are disclosed in one embodiment. The program logic comprises request receiving logic, executed by a processor, for receiving a user request for content recommendations and providing logic, executed by the processor, for providing a plurality of content categories for user selection in response to the user request. Category selection receiving logic is executed by the processor for receiving at least a subset of the categories selected by the user. Based at least on user selected categories, avatar generating logic, executed by the processor, generates a subset of avatars for selection by the user. Avatar selection receiving logic, executed by the processor, receives a user selection of an avatar from the subset of avatars and associating logic, executed by the processor, associates the avatar to a respective user model of the user. Additionally, customizing logic is executed by the processor, for customizing the user model by exchanging communication with the user via the avatar.

A method of providing content recommendations is disclosed in accordance with one embodiment. The method commences with a processor transmitting a user request for content recommendations. The processor receives a plurality of content categories for user selection wherein at least a subset of the categories are selected by the user. A subset of avatars for selection by the user are displayed wherein the subset of avatars displayed to the user are indicative of the user selected categories. A user selection of an avatar from the subset of avatars is received and communication from between user model and the user is facilitated via the avatar, wherein the user model is associated with the avatar for example, by displaying messages from the user model to the user.

A computing device comprising a processor and a storage medium for tangibly storing thereon program logic for execution by the processor is disclosed in accordance with another embodiment. The storage medium comprises transmitting logic, executed by a processor, for transmitting a user request for content recommendations. Content category receiving logic is executed by the processor, for receiving a plurality of content categories for user selection and user category selection receiving logic, executed by the processor, for receiving at least a subset of the categories selected by the user. Avatars set display logic is executed by the processor, for displaying a subset of avatars for selection by the user wherein, the subset of avatars are indicative of the user selected categories. Avatar selection receiving logic, executed by the processor receives a user selection of an avatar from the subset of avatars so that communication display logic, executed by the processor, can facilitate communication from a user model to the user via the avatar, wherein the user model is associated with the avatar.

These and other embodiments and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views:

FIG. 16 depicts an illustration wherein the avatar employed to act as a help agent in accordance with an embodiment of the present disclosure;

FIG. 17 is depicts a schematic diagram of an avatar being employed when the user model is operating in a training mode in accordance with an embodiment of the present disclosure;

FIG. 19 shows a depiction of an embodiment wherein various expressions of the avatar reflect various emotions in response to different content in accordance with an embodiment of the present disclosure;

DESCRIPTION OF EMBODIMENTS

Figure 1:
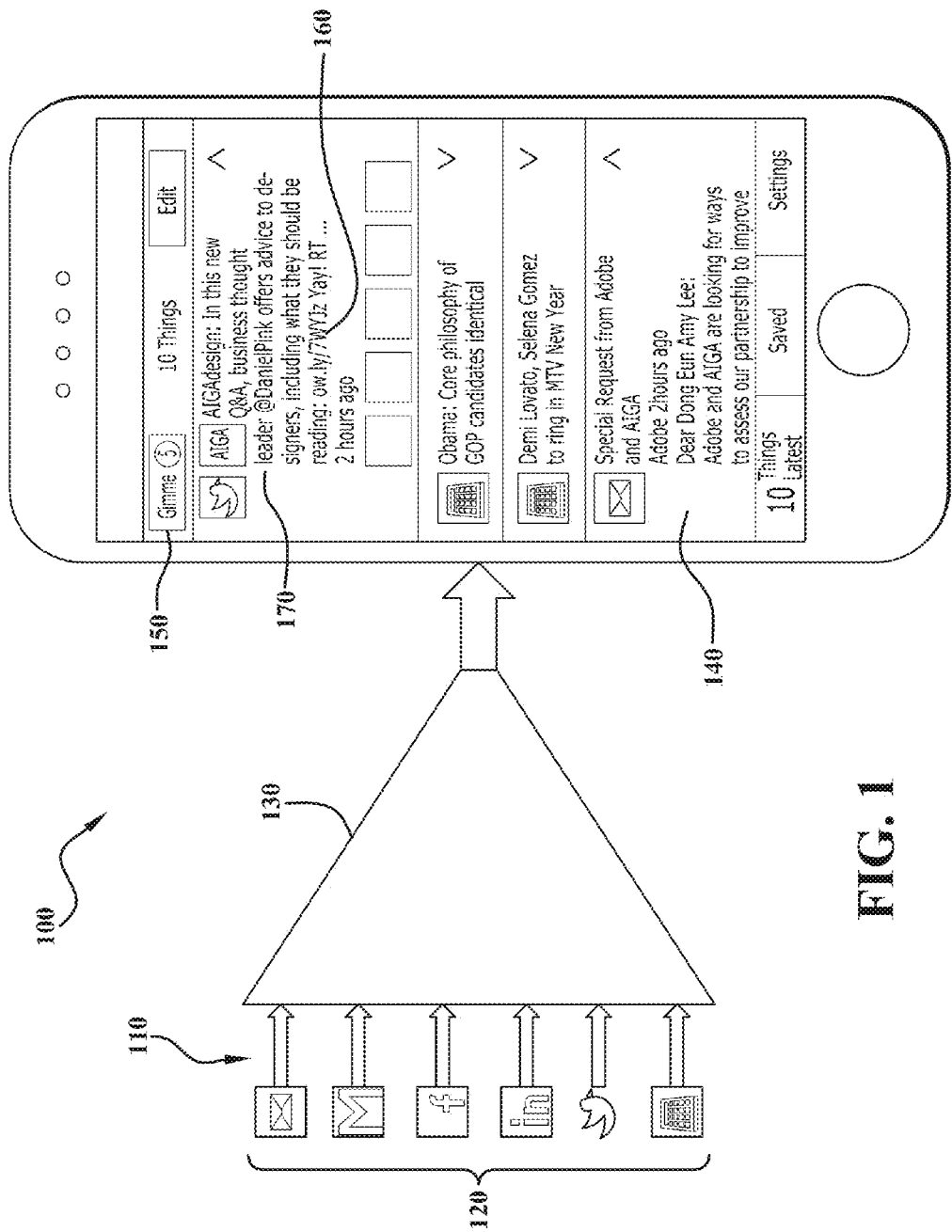
FIG. 1 is a schematic diagram illustrating a process of providing personalized, generalized recommendations in accordance with an embodiment of the present disclosure.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Throughout the specification and claims, terms may have nuanced meanings suggested or implied in context beyond an explicitly stated meaning Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The information age has made available large amounts of data for users to access via different modalities. This data includes both public or private data which is available for access via a computer, telephone, television or any other systems which can include information processors. As more and more personal data goes online and into the cloud, content consumption and other online user activity takes place in a large number of different places and via various devices. A user may employ dozens of different web sites and applications during the course of a day, with all of them competing for the user's attention. Therefore, while a user needs information from a variety of content sources, the sheer volume of information coming from these sources can be overwhelming for any one person to reasonably process, especially within a short time span as the case may be for many customers. Various embodiments described herein provide for recommendation systems and methods that provide recommendations for content from various private and public sources personalized to a user's context that includes the users current needs and preferences. A shortlist of information items can be created that the user might need to know here and now. Alternately, the embodiments provide for a "mother of all feeds" that aggregates and forwards, in real time, relevant, actionable and/or engaging content that matters most to the user.

Turning now to the figures, FIG. 1 is a schematic diagram 100 illustrating a process of providing personalized, generalized recommendations in accordance with one embodiment. A plurality of input content streams or feeds 110 from a plurality of sources 120 are received. In an embodiment, the plurality of content sources can include any constantly streaming source of information. Content from the input streams or feeds 110 is aggregated and the aggregated content 130 is filtered to identify relevant content 140 or content requiring immediate user attention 140 so that it can be forwarded to the user. Various content sources 120 that produce public and private content can be accessed and different types of content streams in various data formats can be aggregated. By the way of illustration and not limitation, the content sources 120 can comprise public content sources such as news sources, blogs, deals or alerts such as, those from weather or financial information sources. The content sources 120 can also comprise private content sources such as, email, social networks or calendars. The aggregated content streams 130 can be time-ordered streams filtered by relevance to the user's current context. In one embodiment, the latest content comprised in the aggregated content streams 130 can be displayed to the users. For example, the top ten latest items aggregated from the feeds 110 can be provided to the user in a personalized web page of the user or in an application (an "app") associated with a mobile user device. In another embodiment, the aggregated content streams 130 are forwarded to the user only upon receiving a user request for content. A user request for the latest content from the sources 120 can be received. In an embodiment, content that is relevant for current user context is retrieved wherein the relevance of content items in the aggregated content streams 130 is determined in real time upon receiving the user request. For example, the user can activate a 'gimme 5' button 150 in order to obtain, for example, the top five recommendations selected from the aggregated content streams 130. In the embodiment illustrated in FIG. 1, the relevant content 140 forwarded to the user includes a top scoring item which is a TWITTER feed, followed by two news items and an email. By the way of illustration and not limitation, the information transmitted to the user can include a summary of the item 170 followed by a link to the item 160. Therefore, the relevant content 140 transmitted to the user comprises items from both public and private data streams from which content items are scored and ordered based on various criteria as will be detailed further infra. In one embodiment, the relevant content 140 forwarded to the user can be limited to include a specific number of content items. In FIG. 1, the relevant content 140 displayed to the user includes the latest ten things that demand the user's attention. It may be appreciated that the maximum number of content items is specified herein only by the way of illustration and not limitation.

In one embodiment, a query-less search procedure can be implemented based on an understanding of a user's needs in real-time, adapting to user's interests changes, location changes and changes in the time of the day by employing a filtering mechanism that is adaptive and personalized on a per-user basis. In one embodiment, a search based on a user query for a particular type of content from a particular content stream or for content items having user-specified attributes from various content streams can be aggregated for presentation to the user.

In order to build the personalized content recommendation system 100 wherein the content is constantly changing, hyper-personally relevant, the following are non-limiting examples of preferred considerations to be addressed:

A. Cold-start: Ensuring that the recommended items are relevant the first time a user begins to use the recommendation system 100 in order to mitigate the users from abandoning usage of the recommendation system 100.

B. Implicit model: Automatically building a robust representation of the users' interests with as little explicit customization as possible since users typically will only invest a small amount of cognitive energy on customizing the recommendation system 100.

C. Learning & forgetting: Adjusting the user model based on user behavior (or absence of behavior).

D. Discovery: Ensuring that the user model does not get "trapped" in a local optimum, and allows the user to discover content on topics they may not have previously seen, including trending topics.

E. Transparency: Representing the user model in such a way as to aid interpretation, as well as supporting a user-friendly view (for example, to let the user know what the model thinks are relevant topics for him/her).

F. De-duping: Detecting duplicate or near-duplicate content, and being smart about when to recommend it and when to not recommend it.

A recommendation system or methodology may address at least partially the aforementioned challenges by combining the following features:

1. An Information Retrieval vector-space model to represent users, articles, and categories, which allows for a simple similarity criterion used for both recommendation and duplicate detection.

2. Leveraging lightweight explicit customization to prime the cold-start model, while also providing a mechanism to support discovery of new topics as well as trending topics.

3. Exploiting simple "Rocchio" style feedback in real-time to update the model based on user behavior.

4. Adapting parameters of the model in real-time to target desired user and system behavior, for example, based on click-through rate of the user or recommendation rate of the recommendation system.

Figure 2:
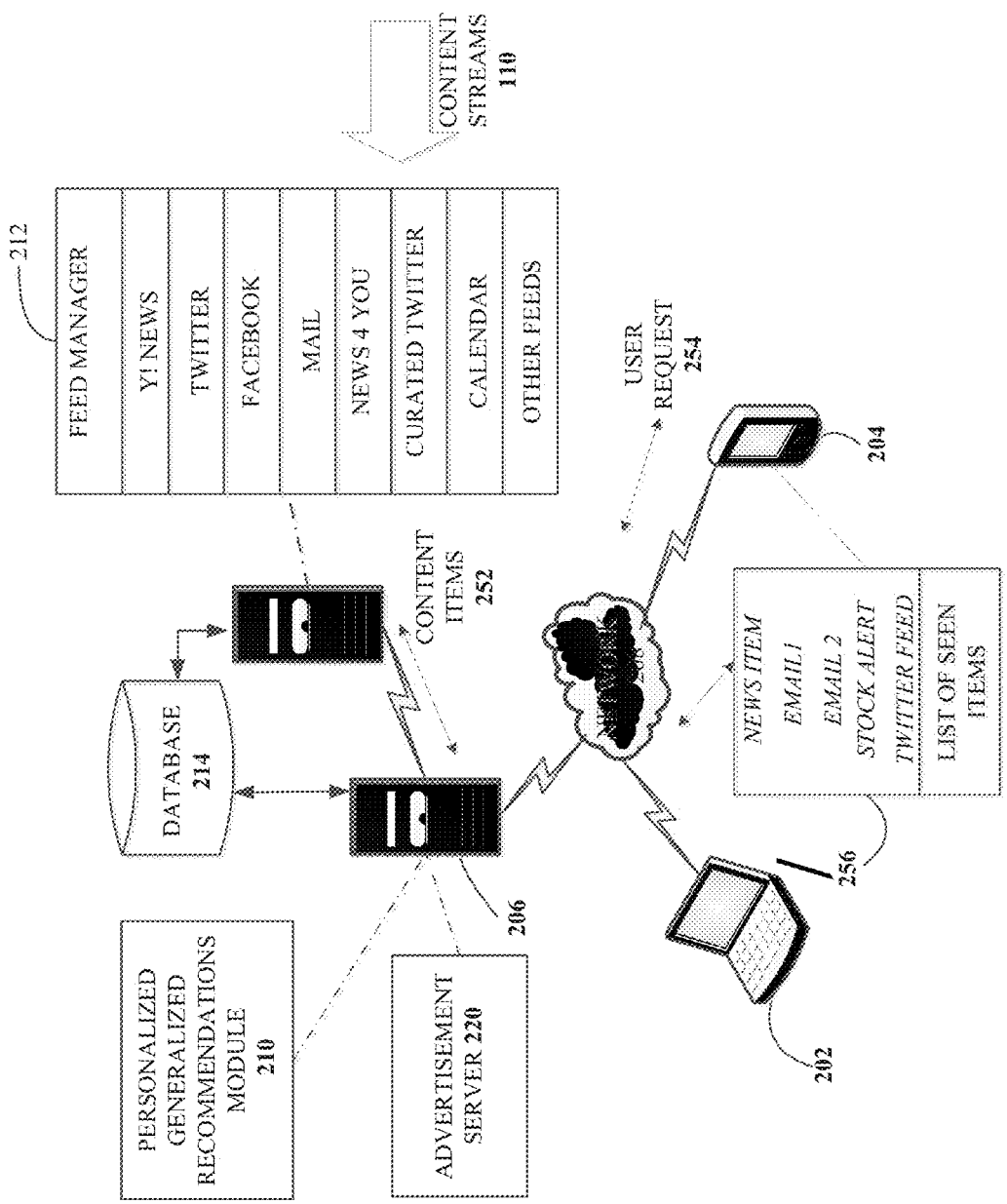
FIG. 2 is a block diagram depicting certain modules within the recommendation system in accordance with an embodiment of the present disclosure.

FIG. 2 is a block diagram depicting certain modules within the recommendation system 200 in accordance with an embodiment of the present disclosure. The recommendation system 200 can include a user computer/client device 202 or 204 that communicates with a server computer 206 over a network 208 such as the Internet. In one embodiment, the server 206 includes a personalized, generalized content recommendation module 210 which, in turn, can be communicatively coupled to a feed manager 212 that comprises drivers for each data source from which it receives content streams 110. It may be appreciated that the recommendation module 210 and the feed manager 212 are shown separately herein by the way of illustration and that a single computing device can implement the recommendation module 210 and the feed manager 212. In one aspect, the feed manager 212 is operable to store the received content streams or feeds 110 in a recommendation database 214 and/or to further process the content streams 110 for efficient distribution. For example, the feed manager 212 can extract data and/or metadata from the content included in the various feeds 110 and normalize the metadata into standardized format and inject events into the recommendations module 210.

The personalized, generalized content recommendation module 210 receives the content items 252 from the feed manager 212 and processes them in order to determine those content items that are relevant to the user. In an embodiment, the relevance of the received content items 252 can be calculated and a subset of the content items that are determined to be relevant can be stored in unseen items list (not shown) for example, in the recommendations database 214 prior to being forwarded to the user. The relevance of the received content items 252 can be determined by employing a user model that incorporates the user attributes and preferences. The user attributes/preferences can be collected explicitly via user input, for example, when the user initially signs up with the recommendation module 210 and/or implicitly via automated learning mechanisms incorporated into the recommendation system 100 as will be further detailed infra.

In one embodiment, a request 254 for unseen content items that are relevant to the current user context can be received from a user employing the user device 204. The user's current context can be determined based on the information associated with the user request 254, such as, the time at which the request was received or the location information. In an embodiment, the location information associated with the user request 254 can be determined from the user's current GPS coordinates as obtained from the device 204. In addition, the current user context can be also be determined based on social context of the user and its combinations with other context information available from different public/private sources such as, for example, the user's calendar. Based on the current user context information gathered by the recommendation module 210, a relevance score of the items stored in the unseen items lists for the user of the device 204 is determined. As shown in FIG. 2, a list of seen items 256 is generated by the recommendations module 210 for the user of the client device 204 based on the determined relevance scores. In particular, the relevance scores of all the relevant content items from the unseen lists that comprise content items associated with various content types are compared and the top 'n' content items are selected for presentation to the user where 'n' is a natural number. By the way of illustration and not limitation, the received content items 252 can comprise a combination of public and private data items such as emails, TWITTER and FACEBOOK feeds, news/weather/stock/deal alerts or other information. Relevant content items from such feeds are aggregated and scored upon receiving the user request 254 so that the list of seen items 256 that is ultimately transmitted to the user can comprise the top five or the top ten content items that include a mixture of items selected from the various content feeds 110. It may be appreciated that if the requisite number of relevant content items are not discovered in response to a user request, the display of the user can be a combination of the latest unseen relevant items and items which are already viewed by the user. In this case, the relevance score can be lowered in accordance with an embodiment that will be detailed infra. In one embodiment, the latest unseen items can be placed at the top of the display regardless of their relevance relative to the already viewed items.

In an embodiment, the received content items 252 can be stored in a database 214 without indexing as their relevance to the different users is calculated in real time even as they are received by the recommendations module 210 from the feed manager 212. In one embodiment, the recommendations module 210 can further implement a feedback mechanism in real time. The recommendations module 210 receives a user's selections of the items in the seen items list 256 and employs the information associated with such selections in filtering content items to be forward to that user. Thus, for example, based on the user selections, the seen items list 256 can be refreshed in real time. Additionally, it can also affect, in real-time, the content items forwarded to other users related to the user such as those that are connected to the user in an online social network or those that the recommendation module 210 has determined have similar profiles as the user making the selections.

In an embodiment, the recommendations module 210 can function as a centralized storage for different types of personalized content consumed by a user or it can store the content items forwarded to the user. The stored contents can be indexed in order to facilitate search and retrieval of specific content items. In an embodiment, the recommendations module 210 can also store not only content recommended to the user, it can also store and index content that is under consideration for recommendation regardless of whether or not it gets recommended. In this context, the recommendations module 210 can provide an uber-index of all of the personally relevant content for a user. In an embodiment, the recommendations module 210 returns search results from such stored content which are ranked based on past user actions. When issuing a keyword search against the items indexed by the recommendations module 210, the recommendations module 210 takes into consideration the user's past actions/interactions with the items when determining their rankings so that, for example, items that have been read or otherwise provided positive feedback for example, will be ranked higher.

In an embodiment, some content that is particularly urgent for a user can be recognized and forwarded to the user so that the recommendations module 210 acts as a notification platform. The content that is pushed can comprise for example, alerts associated with weather, stock prices, traffic.

In an embodiment, an advertisement server 220 can serve context sensitive advertisements to be displayed on web pages or mobile applications associated with the recommendations module 210 based at least in part upon one or more terms associated with the requesting user as will be detailed further infra. Although the advertisement server 220 is shown in this embodiment as located on the same server computer 206 as the recommendations module 210, it can be appreciated that this is not necessary. The advertisement server 220 can also be located with the feed manager 212 or it can also be located independently on an external machine that is disparate from both the server computer 206 and the feed manager 212. In an embodiment, an "ad server" can comprise a server that stores online advertisements for presentation to users. "Ad serving" refers to methods used to place online advertisements on websites, in applications, or other places where users are more likely to see them, such as during an online session or during computing platform use, for example. Advertising may be beneficial to users, advertisers or web portals if displayed advertisements are relevant to interests of one or more users. In an embodiment, advertisements can be presented to users in a targeted audience based at least in part upon predicted user behavior (s) or user profile information.

Figure 3:
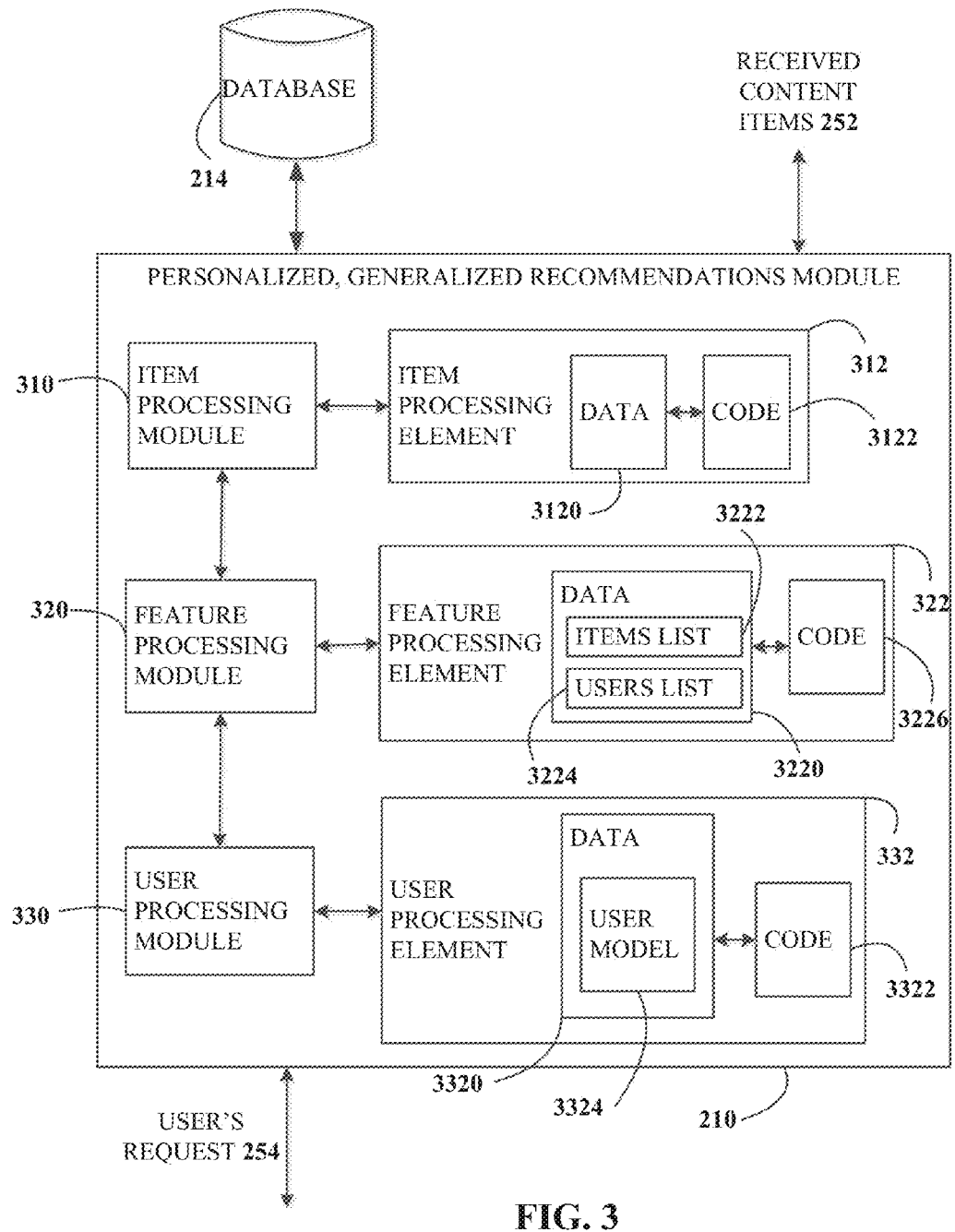
FIG. 3 is a block diagram depicting certain modules within the personalized, generalized recommendations module in accordance with an embodiment of the present disclosure.

FIG. 3 is a block diagram depicting certain modules within the personalized, generalized content recommendations module 210 in accordance with an embodiment of the present disclosure. In an embodiment, the recommendations module 210 comprises three modules, the item processing module 310, the feature processing module 320 and the user processing module 330. The personalized, generalized content recommendations module 210 is built on top of the S4 platform which can be used for processing continuous unbounded streams of data. In one embodiment, a processing module within the recommendation module 210 is operable to generate a processing element which is in an embodiment, a JAVA object that includes high level data and code and which receives and generates events on content streams in real-time. The processing elements may be distributed across as many computing nodes as necessary. The processing elements have their memory state checkpointed to persistent storage, to allow easy re-instantiation if for some reason they are removed from memory (e.g., if a node goes down, or the system needs to be restarted). The processing elements expire after a period of inactivity and are swapped out of memory to persistent storage, but are swapped back in if they start received messages again. This architecture allows for easy scaling so that as more users and more content streams are added, enough new nodes are added to the system incorporating the recommendation module 210 to cover the memory footprint of the new users, items and features. For each active user, the recommendations module 210 qualifies or disqualifies the article/content item as being relevant enough and if it passes this gate, a reference to the article is placed in the user's unseen items list, which in turn is sent to the user as detailed herein. This process of generating events and categorizing the content for different users is done in real-time so that the articles/content items are filtered and supplied to the users even as they are discovered.

Each time a new piece or item of content is received by the recommendation module 210, a representation of the item or an item processing element 312 of the content item is generated by the item processing module 310. As described supra, the item processing element 312 can comprise data 3120 and code 3122 associated with events that an item processing element 312 is configured to process. The data 3120 included in the item processing element 312 can comprise the keywords or features associated with the content item represented by the item processing element 312. In addition, the data 3120 can comprise attributes of the content item which can include, for example, the title, abstract, source, author, or location associated with or referred to in the content item, in addition to other characterizing and/or statistical data. By the way of illustration and not limitation, the statistical data can include data that determines the popularity of the content item which can further comprise the number of users to which the content item was determined to be relevant, the number of users who actually clicked on the content item, the number of users who liked/disliked the content item or the number of users who performed other action such as storing, deleting or forwarding the content item to social contacts. In one embodiment, the item processing element 312 can also store the statistical data associated with each user action, like the number of times the content item was saved/deleted/forwarded so that the relevance of the content item represented by the item processing element 312 can be better determined relative toss the users of the recommendations module 210.

In an embodiment, users of the recommendations module 210 are represented by the user processing elements 332 in a manner similar to the content items. Thus, each active user of the recommendations module 210 is represented by a respective user processing element. When a new user registers with the recommendation module 210, information related to the user is received and processed by the user processing module 330 which generates a representation of the user as the user processing element 332. As described herein, the user processing element 332 comprises data 3320 and code 3322 associated with the user it represents. The data 3320 can include an initial user model 3324 that is generated from the information provided explicitly by the user, for example, while signing up to use the recommendation module 210 and implicit information gathered by observing the user's interaction as will be detailed further infra. The user model 3324 thus generated is further constantly updated based on user interaction with the recommendations module 210. This is achieved by configuring the user processing element 332 to listen for actions taken by the user it represents, e.g., clicking on a given item or forwarding items to contacts, voting ("like" or "dig") for the items or other user action that is recorded and can be employed to update the user model 3324.

In addition to the aforementioned modules, the recommendation module 210 also includes a feature processing module 320 that maintains a correspondence between users 254 and the received items of content 252. When an item of content is received, features such as keywords and/or metadata as described herein regarding the item are extracted, for example, via natural language processing or other techniques. A feature can generally include any piece of data derived from an item or a user and used as input to the filtering decision. Features can include explicit data of content items such as words, or entities. By the way of illustration and not limitation, entities can comprise information associated with the content item such as a source of the content item, author of the content item, a location, a category or a sentiment associated with the content item. They can also include implicit data such as inherent attributes of a content item, for example, an encoding format of a video item. For each feature that is extracted, a feature processing element 322 comprising data 3220 and code 3226 is generated by the feature processing module 320. For each of the recognized features, the feature processing module 320 maintains, for example, in the data 3220 of the corresponding feature processing element 322, a list of content items 3222 associated with a given feature e.g., a word or phrase and a list of users 3224 who express interest in the given feature. For example, for a feature, such as a word "microhybrids", the feature processing module 320 maintains a list of a subset of the received content items 252 which include or are otherwise associated with the word "microhybrids" and a list of active users of the recommendation module 210 who have either implicitly or explicitly expressed interest in the content items that include the term "microhybrids". The code 3224 can further comprise modules for communicating with the item processing module 310 in order to update the list of items 3222 as new items are received by the recommendations module 210. The code 3226 can also comprise modules for communicating with the user processing module 330 in order to update the list of users 3224 so that users can be added or removed from the users list 3224. In an embodiment, only public items such as news items are analyzed by the feature processing module 320, whereas a user's private items such as, emails, are forwarded directly to the user PE 332 for scoring.

When a new item is received by the recommendations module 210, it is analyzed by the item processing module 310 in order to generate the corresponding item processing element 312 and to extract various features from the newly received item that will be forwarded for further analysis to the feature processing module 320. In different aspects, the feature processing elements can be generated from both public and private items based on, for example, user permissions. For each feature obtained from the received content items 252, the feature processing module 320 determines if a feature processing element exists that corresponds to each of the features thus obtained. For example, if the received feature is associated with the feature processing element 322, the newly received item is added to the list of items 3222 comprised within that feature processing element 322 and the newly received item is forwarded to all the users in the users list 3224 comprised within the feature processing element 322 for further scoring. If a feature processing element does not exist for a received feature, it is generated by the feature processing module 320 and the users and items lists are generated and they can be updated as new data is received by the recommendations module 210. In one embodiment, a feature processing element can also be generated from user input to the recommendations module 210. In this case, it is assumed that the feature processing element does not exist within the recommendations module 210 because if there was a feature processing element for the user input feature, then the user would have been added to the users list of the corresponding feature processing element. However, in this embodiment, a feature processing element is generated from user input and its list of items and users is expanded as the feature gains popularity among the users at large and is used more often in published/public content. The feature processing elements, therefore, act as gates that sort the various content items that need to be distributed to the different users based on their attributes. The feature processing elements act as go-betweens executing a firstpass matching of items with users. They can act as a dynamic, always-up-to-date index and thus mitigate the need for scoring each content item by the user model 3324. In one embodiment, only public data such as news items or public blog posts are processed by the feature processing elements whereas private data such as emails intended for a particular user bypass the feature processing elements and are transmitted directly to the user processing element 332 for scoring.

In accordance with an embodiment the different processing elements are generated by modeling the users, categories/features and items of content within the recommendations module 210 as vectors. The feature space for user, item, and category vectors consists of terms (single words or bi-grams) that have been stripped of some special and non-ASCII characters, and stopped (common, non-meaningful words are ignored, and bigrams with one or more stopwords are also ignored). Depending on what field of the item they are taken from, they may be lowercased as well. All vectors V are kept normalized by setting $V_i=1$ for all $V_i>1$, any time a new vector is computed (this ensures the highest weighted feature has a value of 1). Furthermore, the number of non-zero entries in each vector is limited to some number (e.g., 1000 for user and item vectors, 10,000 for category vectors). Vectors are also normalized by setting their lowest-value entries to 0 when this maximum is exceeded.

In an embodiment, every item or article is preferably represented by a vector: $D_{g,\ c,\ d}$ where the item has a guid (global unique identifier) g, is possibly labeled with a category c, and was published/received on day d. A modified version of tf-idf (term frequency—inverse document frequency) weighting is used to populate the item vector. Specifically, term frequency is the sum of occurrences of the term in title or snippet (with unigrams in the title counting twice), and the document frequency term is:

$$\tanh\left(\frac{TotalDocuments}{500 \cdot DocFreq}\right).$$

Additionally, when an item has an author or source, that string is added as a feature with a weight of 1. All new users are asked to select from a list of preferred categories, for example, from a list of eight possible categories. The initial user model for user x who has selected a list of categories C, is simply a term vector that is taken from a set of cold-start vectors: $V_c$. These cold-start vectors are computed on an ongoing basis. By the way of illustration and not limitation, at ten minute intervals, the vectors for the hundred most recent items for a category are summed and added to $V_c$, which is then decayed using a constant that equates to a 0.8 daily multiplier.

In an embodiment, category vectors $V_c$ are therefore, used as both the initial user vector, as well as a component of the evolving user vector. This provides a direct way to give the users reasonable content recommendations for the outset thereby addressing the cold start challenge, with an implicit model that requires little input from the user. It also directly helps set user expectations by making explicit to them what types of content they can expect to receive as recommendations. As the category vectors $V_c$ are computed continuously, they always represent the recent content in any category most strongly, and thus, as part of the user vector, they help make sure users are able to discover new, trending content thereby ensuring that a user model does not get "trapped" in a local optimum. Furthermore, since different users may use the recommendations module 210 in different ways. Some users may want hyper-relevance while others may expect more discovery. An explicit parameter $\alpha_x$ as detailed further infra to trade-off how much of the category vectors are used in the user vector and thereby will allow the recommendations module 210 (or the user) to adjust this property.

Figure 4:
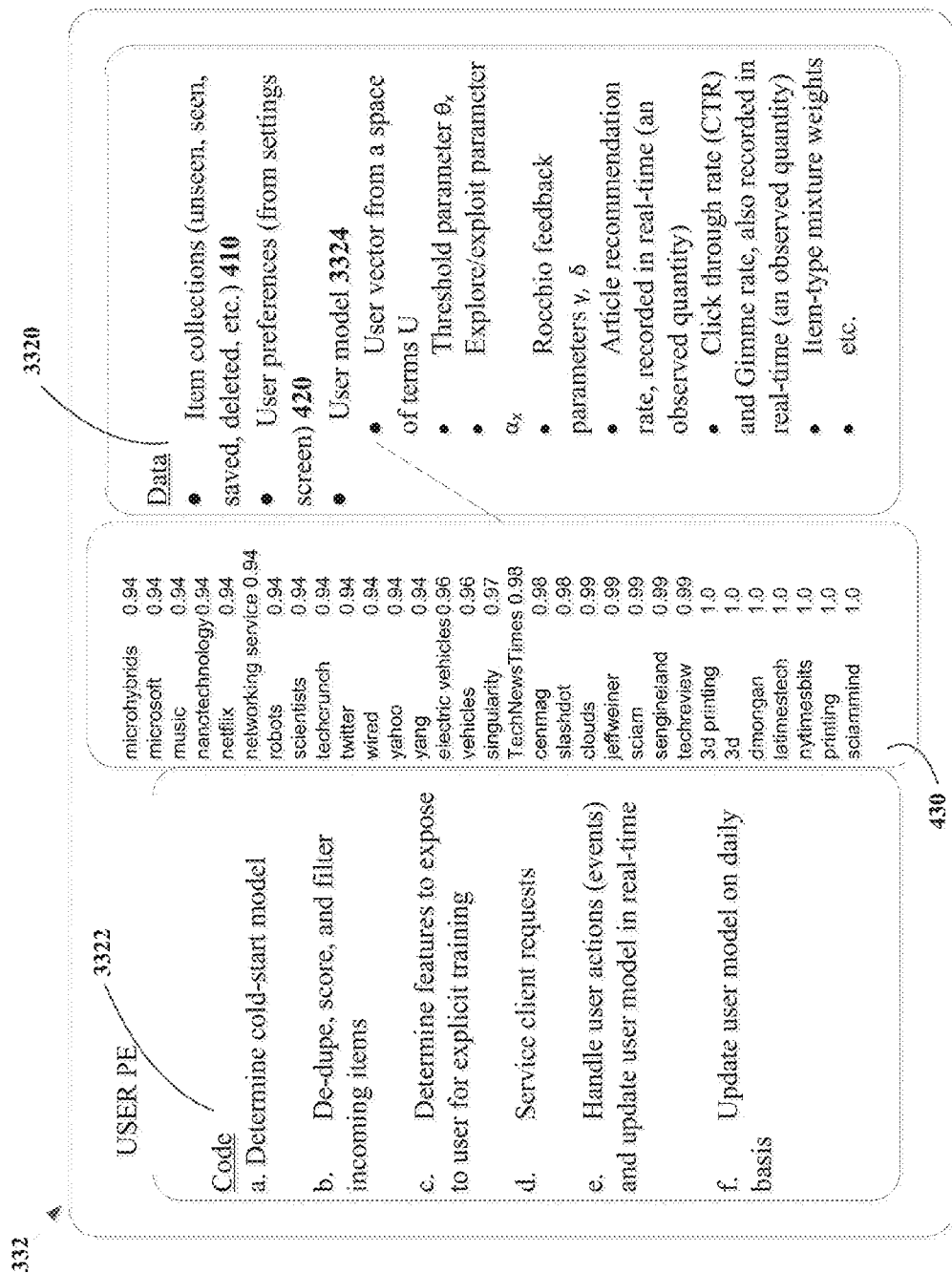
FIG. 4 shows the user processing element (user PE) that represents a user in accordance with one embodiment.

FIG. 4 shows the user processing element (user PE) 332 that represents a user in accordance with one embodiment. As discussed supra, the user processing element 322 includes data 3320 and code 3322 associated with a particular representation of the user. These aid in determination of accurate recommendations for the user represented by the user PE 322. The data 3320 can comprise user attributes such as age, location, demographic information of the user in addition to different item collections 410 that are unique to the user who is represented by the user PE 332. These can include without limitation, collections of seen items, unseen items, saved items, deleted items, items recommended to other users, liked or disliked items. It may be appreciated that the listing of item collections 410 for the user PE 332 is by no means exhaustive and that the item collections 410 can be expanded as more actions can be executed by the user within the recommendations module 210.

The data 3320 also includes user preferences 420 that are collected from the user, for example, via a settings screen. These can include, for example, the privacy setting of the user, the themes to be used for a user interface, the information to be displayed for various screens of the user interface and other user preferences. In addition to simply providing the stream of recommended content, one embodiment of the recommendations module 210 also provides for "lenses" which are filters based on different content attributes. The user can therefore, "drill down" on specific attributes of recommended content, so they see only trending content, content from a particular publisher or author, content from a specified time period in the past or future, content associated with a given location, content containing specific keywords, content based on sentiment (positive, negative, happy, sad, shocking, etc.) and content based on any other meta-data. In an embodiment, such lenses can be associated with specific content sources under the user preferences 420.

Again, it may be appreciated that the user settings are listed herein by the way of illustration and not limitation and that other user settings/attributes obtained explicitly or implicitly can be included in the data 3320 as user settings. In one embodiment, the user settings can also include the user's avatar selection. As will be described further infra, the avatar of a user is employed to represent the user's user model and a user's selection of an avatar can be a feature of the user model 3324 which is employed in making personalized, generalized recommendations to the user.

The user model 3224, also comprised within the user PE 332, generally includes all of those parameters of the recommendations module 210 that are used on a per-user basis to make the filtering decision for an item. It is employed to score and recommend items to a user that it represents. As described supra, the user model 3324 is built using the Vector Space Model which is a list of terms (words and phrases) or other features, with associated weights and modified dot-product for measuring similarity. Representing the user in a manner similar to which the content items are represented, which is in terms of words and phrases, makes users and items somewhat interchangeable leading to many uses as will be discussed further herein. Since word-based features are used to represent the user, parts of the user models can be exposed to the users themselves which allows direct user manipulation or otherwise provides insights which can be useful in improving recommendations made to the users. In fact, modeling the user on word-based features can also assist the user with other search activities. For example, when the user is issuing a keyword search (either within or outside of the recommendations module 210), terms from the respective user model can be used as search suggestions or as input to the ranking functions so that content items including terms from the user model 3324 are ranked higher in the result set.

In one embodiment, user model 3324 comprises, among other data, the following parts:

A user vector U

A threshold parameter $\theta_x$

An explore/exploit parameter $\alpha_x$

Global feedback parameters γ, δ

An article recommendation rate, recorded in real-time (an observed quantity)

Click through rate (CTR), also recorded in real-time (an observed quantity)

It may be appreciated that other user attributes or item features that are used to determine relevance of content items to a particular user can also be part of the user model 3324 in accordance with other embodiments. As discussed supra, the initial user model for a user x who has selected a list of categories C, is a term vector that is taken from a set of cold-start vectors $V_c$. In an embodiment, the category vectors included in a user model 3324 are based on the high-level categories, for example, News categories, which are specified as being of particular interest to a user when the user signs up for the recommendation module 210. The vector representation of each category is maintained by a real time process based on the content items published in that category. A combination of these category vectors based on user preferences is used as the users' initial user model.

Another source for cold-start models are the user's activities on the accounts they have linked to the recommendations module 210. For example, if a user links their FACEBOOK account or other social network account(s) in order to receive recommendations from their FACEBOOK stream, the recommendations module 210 (depending on what gets exposed by FACEBOOK) can gather more important features (like terms) from that account, and add them to the user's model. As an example, words from the user's posts on FACEBOOK or from the posts of entities they follow, from their profile, from what they have "liked", can be retrieved in order to be included as part of the vectors used to build up the user model 3324. In general, any activity on any service the user has linked can provide features (not limited to terms) that may be added or removed from their initial model. In an embodiment, the user model 3324 can be configured to include content the user has viewed prior to registering with the recommendations module 210. This content can be obtained for example, via the user's search history and the content, such as search terms for the user's search history is also aggregated to be included in the user model 3324. Thus, in the case of new users for whom a user model has never been generated, an initial model is built from initial explicit user input and other explicit or implicit information available via various sources so that the possibility of providing poor recommendations and thereby discouraging the users from using the recommendations module 210 is mitigated. This is the so-called "cold-start" challenge, and it also encompasses the ongoing challenge of making sure that the user model does not get "trapped" in always recommending the same type of content.

In a typical information retrieval model, the range of values for the elements in a vector are taken from the interval [0 . . . infinity]. In one embodiment, the user vector U is a special vector called a "Max One" vector, which differs from a typical representation. A list of terms 430 along with their respective weights that can be used to determine the user vector U is shown in accordance with one embodiment. The weights of the user vector (which is a "Max One" vector) can be associated with a specific lower-bound, a parameter called MIN_WEIGHT. Only real-valued weights between MIN_WEIGHT and 1 are allowed for the "Max One" vector, with any operations that cause the weight to go above 1 will instead reset it to 1. For example, the vector values can be limited to the range [0 . . . 1]. Any operations that cause the weight to go below MIN_WEIGHT instead cause the term to be removed from the list. A fixed most important terms to represent a user's interests and which, if some operation causes to grow longer, will automatically remove the lowest weighted terms so as to stay within the maximum length. This version of a vector space model has the effect of naturally supporting two of the abilities required by the recommendation module 210. By limiting the maximum weight to 1, it is ensured that the recommendations module 210 never overweighs a given term for a user, which can result in over-emphasizing content about a specific topic. In addition, by automatically having terms "fall off the end" of the vector, the user model 3324 naturally "forgets" terms that do not otherwise get reinforced by the user so that the possibility of entries growing unbounded as a result of feedback is mitigated. For example, a user may have read an article about soccer at one time, which does not necessarily indicate a continued, deeper interest in soccer. In fact, if this interest is not reinforced by further user selections of content items related to soccer, it is likely that the user was only briefly interested in that particular content item. Therefore, assigning a minimum weight to a term and removing terms that go below the MIN_WEIGHT, automatically keeps finite, the list of terms associated with the user so that only highly rated terms are maintained in the user model 3324 and a user's fleeting or less enduring interest in a particular category/term is forgotten and not maintained within the user model 3324. This mitigates the possibility that content items associated with such passing interests are discarded as less relevant and are not forwarded to the user.

The next parameter in the user model 3324 is the threshold parameter $\theta_x$, which is used to determine if an item is relevant enough to be shown in the user's item list. In addition to the daily updates and feedback updates to the user vector portion of the model, some parameters are also adjusted dynamically. Specifically, the threshold parameter $\theta_x$ is adjusted on a periodic basis to regulate the observed article recommendation rate or the number of articles added to the user's item list per unit time. In one embodiment, the threshold parameter $\theta_x$ is adjusted to achieve a substantially optimal item type mixture weights wherein content items from various types of content streams like news items, social networking feeds, emails or other content types are selected for presentation to the user based on feedback received from the user. This is done by pre-defining a target rate, and then periodically adjusting $\theta_x$ up or down using small increments depending on whether the recommendation rate is above or below this target. Thus, the threshold parameter $\theta_x$ for a given user is not a fixed number, but is dynamically adjusted based on feedback received from the user. In an embodiment, the recommendations module 210 can track the number times the user requests new content and adjusts $\theta_x$ up or down accordingly. Thus, the threshold parameter $\theta_x$ is lowered if the user is requesting new content frequently so the more content is determined to be relevant to the user thereby fulfilling the frequent user requests. Conversely, the threshold parameter $\theta_x$ is raised for a user who does not request content frequently so that the recommendations module 210 maintains a more stringent standard of relevance for recommending items to such a user. In addition, the next parameter of the user model, the explore/exploit parameter $\alpha_x$ is also adjusted in a similar manner, depending on observed click through rate as will be described herein. In one embodiment, a mechanism can be included to let users directly manipulate both $\theta_x$ and $\alpha_x$ to be able to control the flow of recommendations by themselves.

As described supra, the initial user model for user x who has selected a list of categories C, is simply a term vector that is taken from a set of cold-start vectors: $V_c$ which are computed on an ongoing basis. In an embodiment, on a daily basis, the user vector is updated or recomputed as:

$$\alpha_x \sum_{i=0}^{29} w_i U_{x,today-i} + (1-\alpha_x)V_c \qquad \text{Ex. (1)}$$

where $$w_i = \frac{\left(2^{-(i+1)} + \frac{1}{N_x}\right)}{2} \qquad \text{Ex. (2)}$$

and $\alpha_x$ is a user-specific parameter which controls the amount of user-specific features versus cold-start features; $N_x$ is the number of days of history available for user x, and C is the set of category preferences for user x. In an embodiment, this update is done nightly by combining the user model 3324 of the preceding thirty days and the current cold start categories of vectors included in the user model 3324 or when the user changes their category preferences. The term $w_i$ is the weight that will bias more recent user models over older user models and 1/Nx is used because in the initial thirty days that the user registers with the recommendation module 210, thirty snapshots of the user model are not available of updating the user vector. Thus, at any given point in time the user vector is a sum of two components: a weighted sum of the user vector across time (emphasizing recent vectors)—this is the 'exploit' component and a weighted sum of category vectors across time (also emphasizing recent vectors)—which is the 'explore component'. Therefore, if the user associated whose user vector is determined in accordance with Expression (1) above, requests content more frequently, the user vector is adjusted by lowering $\alpha_x$ on the assumption that the user likes the recommended content and therefore the recommendations module 210 is serving the relevant content. On the other hand if the user does not request content frequently, the user vector is adjusted to be weighed more towards the exploitation part of Expression (1). In real-time the user vector is then adjusted using simple "Rocchio" algorithm as will be described further infra.

In an embodiment, when a user x indicates that item D is relevant (for example, by clicking on it, or "liking" it), the user vector is updated as:

$$U_1(x,C)(\gamma U_1(x,C) \pm \delta D \qquad \text{Ex. (3)}$$

where $\gamma$ and $\delta$ are two global parameters, which, in an embodiment are set as $\gamma=0.99$, $\delta=0.85$. In an embodiment, $\delta$ takes positive values for all positive forms of feedback (item clicks, shares, saves, thumb-ups, and maximizes) and a negative value for negative feedback (deletes and thumb-downs). However, the user model 3324 can be extended to use different $\delta$ or different types of feedback, and in accordance with other embodiments it may be different on a per-user basis or may be adjusted dynamically.

In an embodiment, the relevance score of a particular item to a particular user is normalized, squashed dot product given below in expression 4:

$$r_{x,D} = \tanh\left(F \cdot \frac{U_x \cdot D}{\|D\|_1} / 0.1\right) \qquad \text{Ex. (4)}$$

where F is a "fudge factor" that depends on the content type of the item, when the item was published, as well as the number of positive and negative feedback signals the item has received from the overall user population. The tan h is used to ensure the score stays in the [0 . . . 1] range, as well as to shape the score and spread out the distribution. In one embodiment, mail items have a slightly different relevance score as shown below in expression 5:

$$r_{x,D} = 0.1 + \frac{U_x \cdot D}{\|D\|_1} / 0.05 \qquad \text{Ex. (5)}$$

It can be appreciated that all constants have been manually determined by examining data, and are not necessarily optimal and may vary in different embodiments.

Various parameters detailed herein thus aid in optimizing the user model 3324. These operational parameters can be adjusted based on observed behavior of the user and the recommendations module 210. Other recommender systems use traditional machine learning techniques to build classifiers targeting a prediction of probability of click with the hope of maximizing click through rate. The recommendations module 210 can monitor key system metrics on a per-user basis (e.g., click rate, recommendation rate, "gimme" rate, etc.) and then adjust some key parameters (namely, the threshold used to determine recommendation $\theta_x$ and the parameter used to mix cold-start with historical models $\alpha_x$) based on the user's behavior in real-time. Thus, for example, if the user is requesting new items often, their threshold $\theta_x$ is lowered so they get more items, or if the users are clicking on a lot of items, the cold-start part of their model (the term including $1-\alpha_x$) is weighed more heavily in order to give them a more diverse set of items.

The user PE 332 also includes various code 3322 modules that enable it to handle different tasks related to updating the user model 3324 and thereby providing relevant content to the user. One of the various functions that a user PE 332 can execute includes determining a cold-start model for the user. As discussed previously, when a user initially registers to use the recommendations module 210, providing accurate recommendations to the user can be a challenging task based only on the minimum user preferences that are normally collected by recommender systems. Hence, the recommendations module 210 collects information regarding specific content categories that a user is interested in and defines the initial user model based on the user selected categories so that the user receives substantially relevant recommendations even during the initial stages of interaction with the recommendations module 210. Subsequently, the initial user model is updated and fine tuned based on explicit and implicit feedback from the user as described in accordance with different embodiments herein.

Another function that the user PE 332 is configured to handle is de-duping, scoring and filtering incoming items. When the recommendations module 210 receives a new content item, it is forwarded to the user PE 332 based on an initial determination of relevance provided by the feature PEs associated with the new item. Upon receiving the new item or a vector representation of the new item, the user PE 332 initially determines whether the newly received item is a duplicate of a previously received content item. This can be determined, for example, using cosine similarity of the received item to items in seen, unseen and deleted caches. If it is determined that the new item is not a duplicate, the user PE 332 proceeds with scoring and filtering the item in accordance with various relevance criteria associated therewith.

The user PE 332 is also configured to expose certain features of the user model 3324 to the user for explicit training. By the way of illustration and not limitation, features for explicit training can include selected uni/bigrams that are in the item, biasing towards uppercased, author/source, words in title. As the recommendation module 210 models users in the feature space of words and phrases, parts of the user model 3324 can be exposed to the user for fine-tuning so that more accurate recommendations can be obtained. It may be appreciated that explicit training of the user model by the user 3324 can be optional and that the user model 3324 can implement machine learning techniques to automatically fine-tune the user model 3324 based on implicit feedback obtained from different sources including the user actions and/or actions of other users who may share similar interests and hence who have similar user models.

The user PE 332 is designed to service client requests for content items. The user PE 332 can make a determination of relevance each time it obtains a new article and additionally determine relevance between various content types upon receiving user request. Based on the predetermined item type weights associated with each content type, the user PE assembles a list of seen items to be forwarded to the user in response to the user request.

A user PE 332 forwards a list of seen items to a user and records user actions on the content items in the received list. Events generated by user actions such as, clicking on a particular content item, are received by the user PE 332 and employed to update the user model in real time In addition, the user PE 332 also functions to update the user model on a periodic basis in accordance with various embodiments as detailed further infra.

In an embodiment, the user PE 332 can be used to locate context sensitive, targeted advertisements for presentation from the user. For example, information from the user model 3324 can be employed in identifying targeted advertisements for presentation to the user along with the content recommendations. In an embodiment, different types of advertisements which are relevant to information in each of the content items in the aggregated content stream 130.

Figure 5:
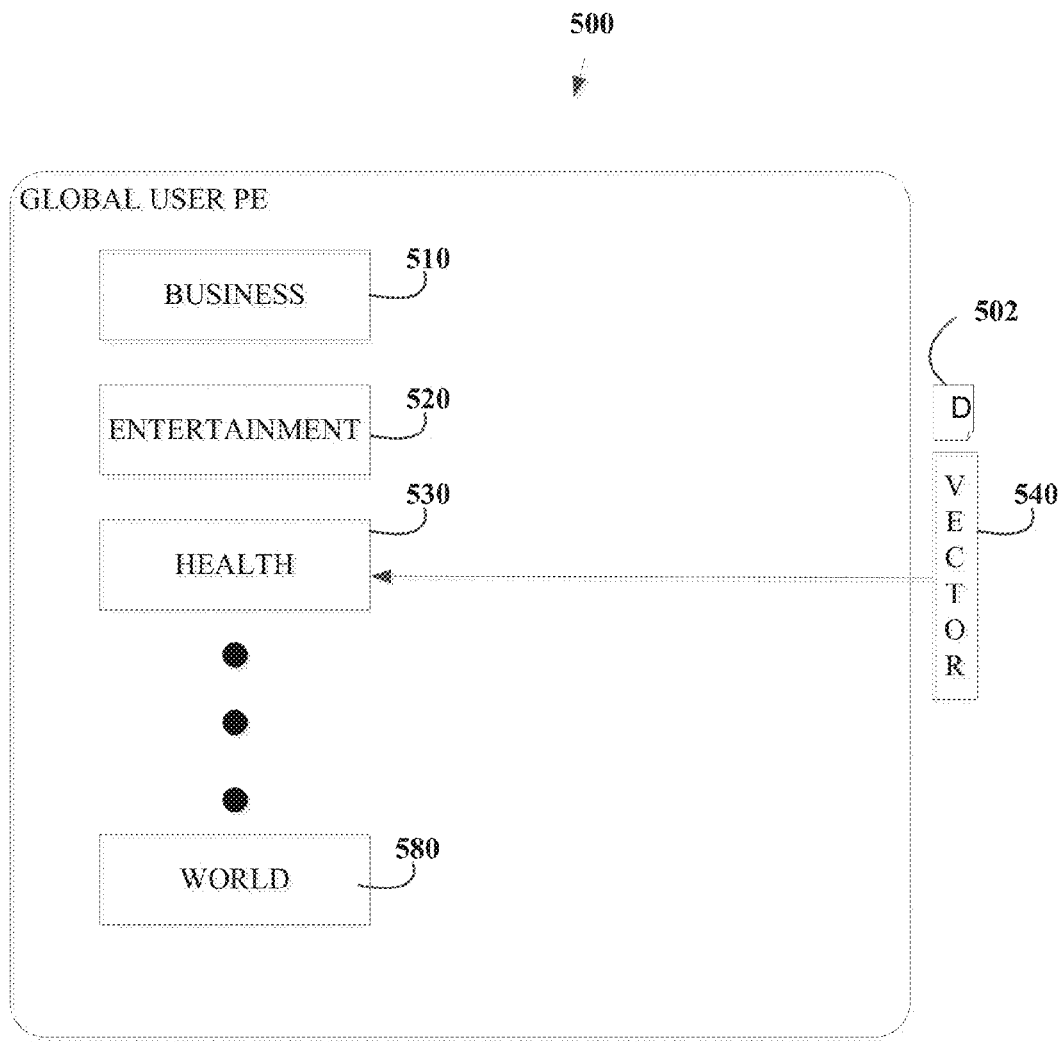
FIG. 5 illustrates a global user processing element (user PE) in accordance with an embodiment.

FIG. 5 illustrates a global user processing element (user PE) 500 in accordance with one embodiment. The global user PE 500 is a hypothetical entity that is designed to address the cold start challenge associated with new users of the recommendation module 210 by aiding in the exploration aspects as detailed herein. In particular, the global user PE comprises models of various categories, for example, news categories that can include business 510, entertainment 520, health 530, or other categories like world 580. In general, the global user PE 500 maintains a model each for a finite number of categories associated with various content items that can be received by the recommendations module 210. In case a new document or content item D is received by the recommendations module 210, a vector representation 540 of the content item D is generated and a category associated with the content item D is retrieved. For example, if the content item D is associated with the health category 530, the vector representation 502 of the content item D is added to the health category vector and the new health category vector thus generated is decayed as detailed supra. Thus, at any given time, the global user PE 500 conveys a substantially accurate representation of all the words and phrases in the latest news articles of a particular category. When a new user registers with the recommendations module 210, the new user selects specific categories for receiving content items and those specific user-selected categories are included in the initial user model thereby addressing the cold start challenge. Additionally, since the user is also represented by a vector, typical clustering techniques can be used to create groups of related users and aggregate their vectors to create the vector for a new user, again by looking at other attributes they share in common like age, sex, location, News category selections, Avatar selection, or other selections the user makes when configuring the recommendations module 210 for personal use.

Moreover, the updated category vector, for example, the updated health category vector described above is also folded into the user models of the users who indicated their interest in the health category. Thus, the user models of all the users are automatically updated with the new features from the health category 530 in real-time and/or on a periodic basis.

Figure 6:
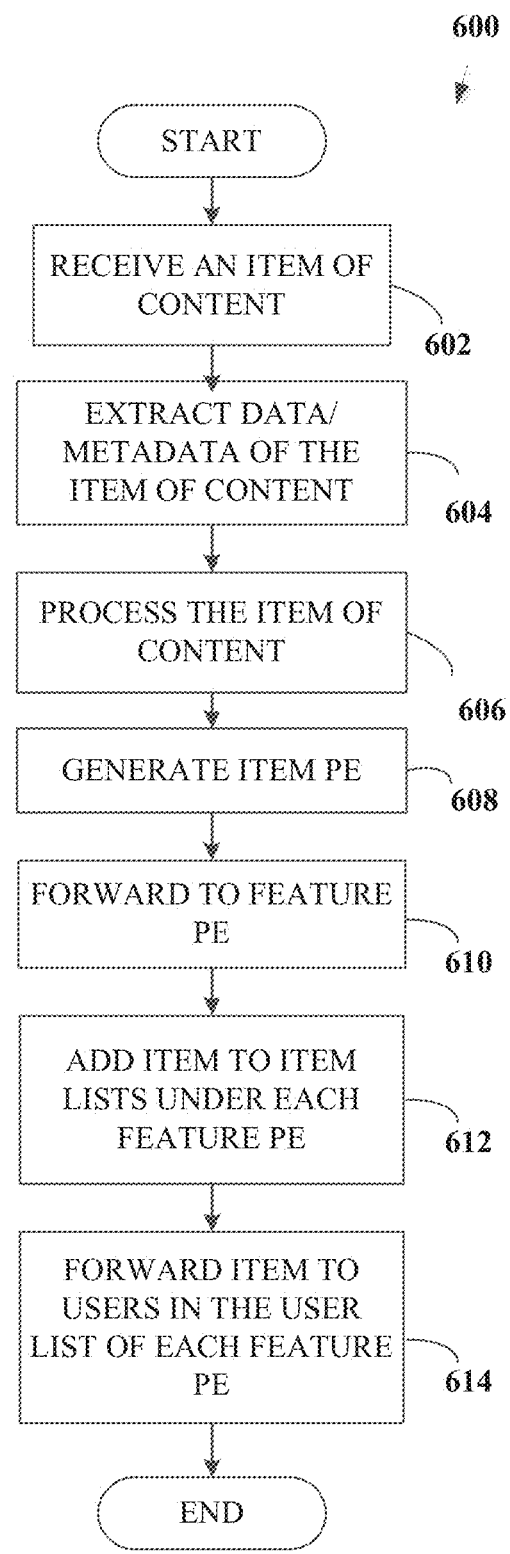
FIG. 6 shows a flowchart illustrating an embodiment of a method of forwarding content items to users in accordance with one embodiment.

FIG. 6 shows a flowchart 600 illustrating an embodiment of a method of forwarding content items to users. The method begins at 602 wherein an item of content is received. At 604, different data and metadata associated with the received item of content are extracted. The data associated with the received item of content can comprise features such as the terms or keywords associated with the item of content, source and author of the item of content, a location referred to or associated with the item of content, the date of publication of the item of content. It can be appreciated that data and metadata in addition to those listed herein and associated with the received item of content can be extracted in accordance with this embodiment. At 606 the received item of content is processed. As detailed herein, the processing of the content item can comprise normalizing the metadata associated therewith into a standardized format and triggering an event associated with the received content item. At 608, an item PE, which is a representation of the received item of content is generated. At 610, information associated with the received item of content is forwarded to respective feature PEs. In this embodiment, if the data extracted from the item of content is, for example, keywords to be associated with the content item, the received item of content or a representation of the received item of content is forwarded to feature PEs that represent those keywords extracted from the item of content. At 612, the item of content is added to the item list under each of the feature PEs that receive the item of content. In one embodiment the feature PEs that receive the item of content can be processing elements that represent various news categories. By updating the feature PEs with new content items in real-time even as the content items are received, a real-time process for constantly maintaining a vector representation of each category based on the content items published in that category is implemented.

At 614, the item of content is forwarded to the user PEs associated with the users in the users list comprised within each of the feature PEs. The users list associated with a feature PE is assembled based on explicit or implicit user input. For example, the user may have explicitly added a particular keyword to the list of terms 430 in the user PE 322 or the user may have provided an implicit input via selecting or clicking on articles associated with the keyword corresponding to the feature PE. Therefore, the user has been included in the users list of the feature PE corresponding to the keyword. As discussed supra, the feature PE is configured for a first-pass estimation of relevance of the received content items to the users so that the user PEs of each individual user is not overwhelmed with content whose relevance is to be determined. The received content of item is again scored at the user PEs to determine relevance prior to being forwarded to the users as will be detailed further infra.

Figure 7:
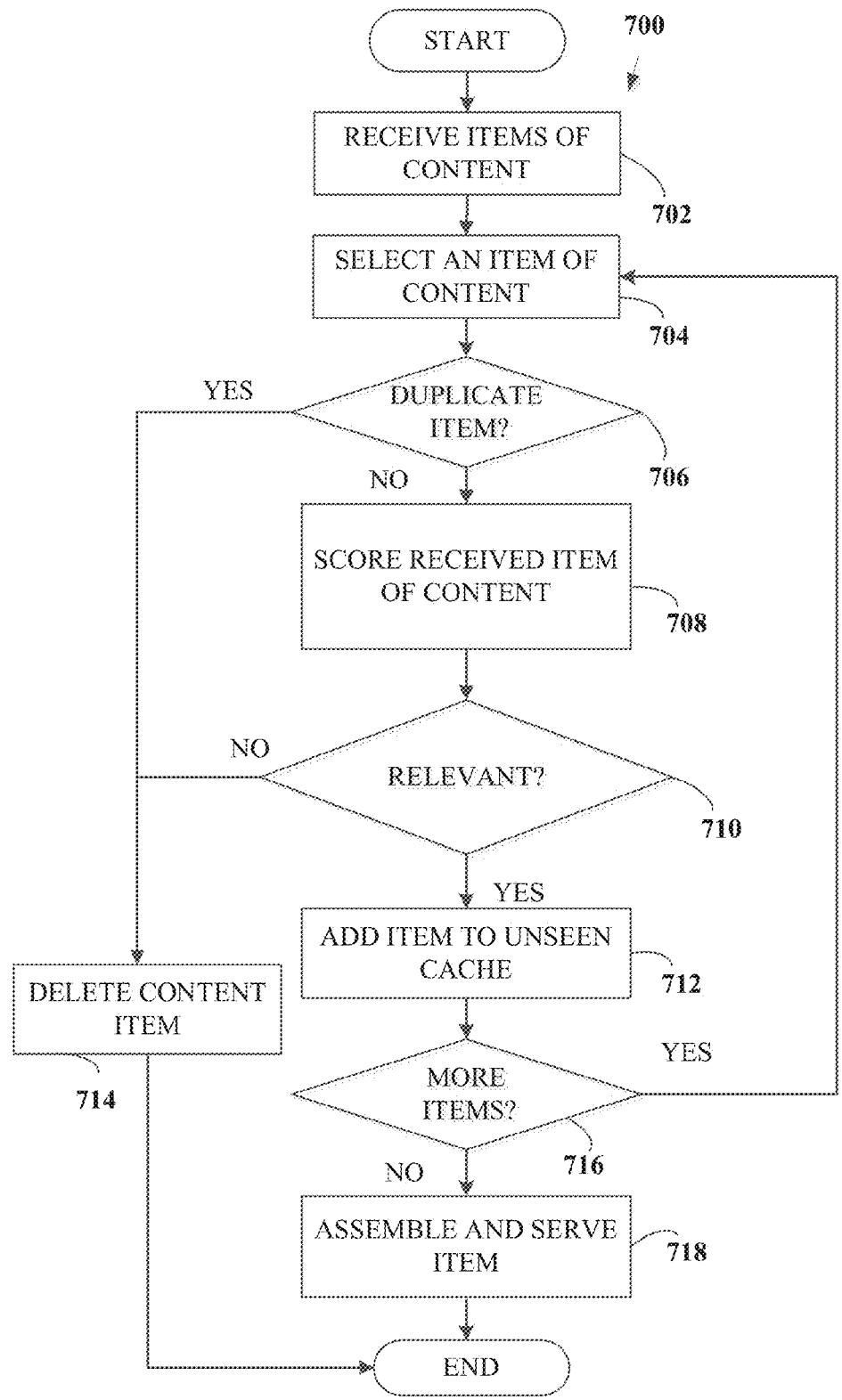
FIG. 7 shows a flowchart illustrating an embodiment of a method of forwarding relevant content items to a user associated with a user PE that receives a new item of content in accordance with one embodiment.

FIG. 7 shows a flowchart 700 illustrating an embodiment of a method of forwarding relevant content items to a user associated with a user PE that receives a new item of content. The method commences at 702 wherein a plurality of items of content are received by a user PE which is a representation of a particular user as detailed herein. In an embodiment, the items of content are received from a feature PE upon a determination that the content items are of interest to the user because the user was included in a users list associated with that particular feature PE. Thus, if a plurality of content items are received by the recommendations module 210, the feature PEs substantially filter out irrelevant content and forward only content that has at least some degree of relevance to the user. Therefore, only a subset of content items received by the recommendations module 210 from the various data sources are actually forwarded to a user PE for relevance determination/scoring. At 704, a content item from the received content items is selected and de-duping or a process for identifying duplicate content items from multiple content sources is executed at 706. Thus, if it is determined that the received item of content is a duplicate of a previously received content item the received content item is deleted as shown at 714 and the process terminates on the end block If upon de-duping at 706, it is determined that the content item is an original content item and does not duplicate information previously forwarded to the user, the received item of content is scored by the user PE in order to further determine its relevance to the user as shown at 708. In one embodiment, the relevance of the content item is determined based on the current user context. This determination based on the user's context can include a comparison of these features for the user to those for each item. By the way of illustration and not limitation, the current context can comprise time of day, day of week, month of year, and location. The user PE does this determination of relevance by noting the meta-data for each item, when it is interacted with by the user, and then preferring items with similar meta-data when the user is in a similar context. For example, if the user clicks on a weather forecast item in the morning, then weather forecasts will more likely be recommended in the morning in the future. Similarly, clicking on a traffic alert while the user is at work will lead to more traffic alerts at work. In other aspects, metadata associated with items such as identity of a sender or presence of certain keywords can be considered in the determination of contextual relevance. At 710, a determination of relevance is made based on the score. If, it is determined that the content item is not relevant to the user, the content item is deleted as shown at 714 and the process terminates on the end block without forwarding the content item to the user's unseen items list. In particular, the score is compared with a threshold parameter and if the relevance score exceeds the threshold parameter, the received item of content is determined to be relevant and is therefore added to the unseen items cache as shown at 712. In one embodiment, an unseen list of items is maintained for each content type. For example, an unseen content items cache can be maintained for each of email type of content, news content type, FACEBOOK posts or other types of contents based on the content streams that a user PE is configured to process. At 712, it is determined if more content items need to be processed in order to determine their relevance to the user. If yes, the method loops back to step 704 wherein the next content item is selected. If no more content items exist, a list of relevant items is assembled as shown at 716 from the unseen items list and served to the user in accordance with an embodiment as will be further detailed infra. Thus, the recommendations module 210 has two stages of filtering wherein the feature PEs forward a first subset of received content items to the user PEs and the user PEs will added a subset of the received first subset of content items to the unseen items lists. Additionally, the recommendations module 210 also includes a third stage of further filtering wherein content items will be re-scored prior to being forwarded to the user as will be detailed further infra. It may be appreciated that filtering by feature PEs and scoring by user PEs can occur constantly in real-tine as new content flows into the recommendation module 210.

Figure 8:
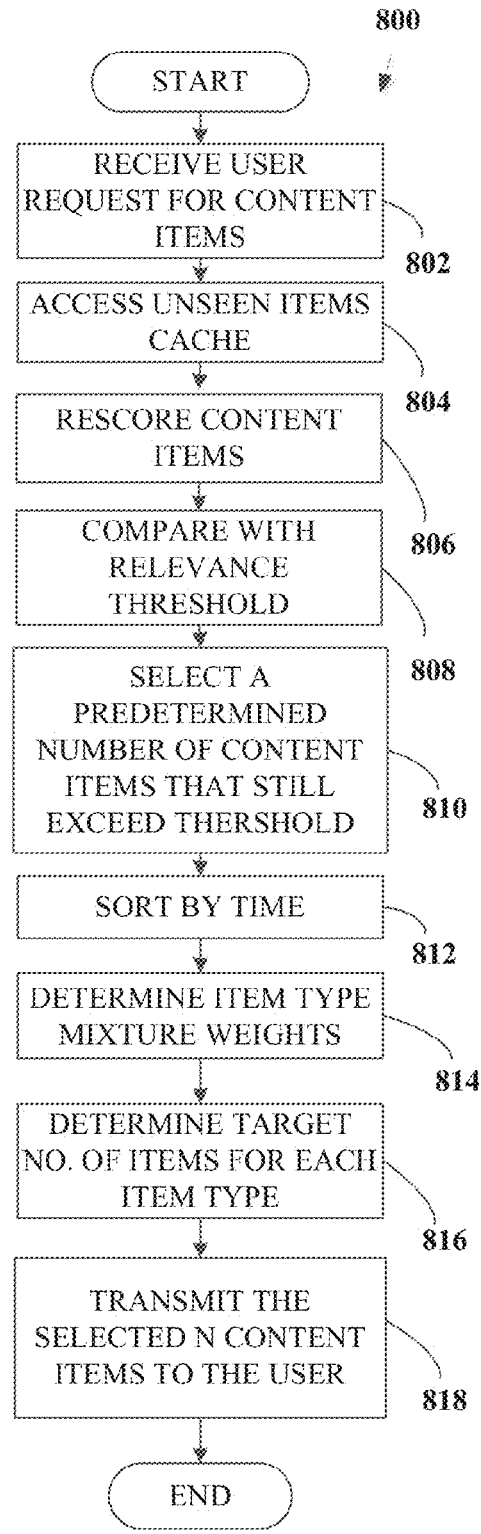
FIG. 8 shows a flowchart illustrating a method of forwarding relevant content items to a user in accordance with an embodiment of the present disclosure.

FIG. 8 shows a flowchart 800 illustrating an embodiment of a method of forwarding relevant content items to a user. The method begins at 802 wherein a user request for fresh, unseen content is received. In one embodiment, the user request can be received in the form of a 'gimme' gesture. For example, the user can click a 'gimme 5' button 150 included on the user interface indicating the user's desire to receive the top five content items from the various content types pre-assembled in the unseen content items lists as detailed supra. It may be appreciated that while the "gimme 5" gesture is based on the colloquial "Gimme 5!", the number of content items served to the user in response to a user request is only specified herein by the way of illustration and not limitation and that any number of content items can be served based, for example, on the determination of relevance and the availability of the content items to the user PE. Content consumption experiences typically give the user little or no control over the rate at which content is served or recommended to them. Therefore, in order to provide more control to the users over the volume of content served to them, the "gimme" gesture can be paired with an indicator to the user of how much content they are going to receive when they take the action. If no particular amount is specified, the recommendations module 210 can default to a preset number. In a further embodiment, the default number of content pieces served to a user can be determined for each user uniquely and can also be adjusted dynamically based on the rate at which the user consumes content or the frequency of user interaction with the recommendations module 210. When a "gimme" is executed, the user is served a number of pieces of content in accordance with the expected number. In an embodiment, they are not served more content unless they execute the "gimme" gesture or request for content again.

At 804, the unseen items cache is accessed. The cache of unseen items comprises of those content items that are determined to be relevant to the user upon scoring by the user PE 332. In an embodiment, the cache comprises separate list of unseen items for each content type. Accordingly, the lists can comprise by the way of illustration and not limitation, an unseen emails list that comprises, for example, the ten latest, unseen emails that are determined to be relevant to the user, an unseen news items list which can comprise latest, relevant news items which were not seen by the user, a list of latest, unseen, FACEBOOK posts, and a list of latest, unseen tweets from TWITTER. At 806, the content items are rescored in order to determine their relevance to the user based on, for example, current user context in accordance with embodiments as described herein. At 808, the relevance score of the content items obtained at step 806 is compared with the relevance threshold and a predetermined number of content items that still exceed the relevance threshold are selected at 810. The selected content items that exceed the relevance threshold are sorted by the temporal metadata associated therewith at 812. In one embodiment, the temporal metadata can be a time at which the particular content item was received. In one embodiment, the temporal metadata can be a time at which a particular content item was published. The selected content items can either be sorted from the latest to the oldest content item or conversely from the oldest to the latest content items based on, for example, user preferences associated with different types of content items. The recommendations module 210 can permit the user to select the sort order so that the user may select different sort orders for different content types. For example, for private data such as emails, the user can choose to receive the oldest unseen relevant email first whereas for public data such as news item types, the user can choose to receive the latest unseen news item first.

At 814, the item mixture weights for different content types are determined. As described herein, the recommendations module 210 takes a wide variety of content types as input and determines not only how to score them but also how to ensure that there is a reasonable amount of diversity in the recommendations or content lists forwarded to the user. In an embodiment, the fudge factor F described supra with respect to expression (4) is employed for scaling the scoring function based on content types. In addition, each major content type (e.g., News, FACEBOOK, TWITTER, Email) has a target percentage associated with it, which varies over time as the user interacts with the recommendations module 210. By the way of illustration and not limitation, the content types that can be included in the recommendations module 210 can comprise: Email (from YAHOO! or any other email provider), FACEBOOK Newsfeed (personal), GOOGLE+ feeds (personal), Horoscope, LINKEDIN News, status updates, Local News, Local deals and ads, Local events, Local points of interest, Local traffic reports, Local weather and weather alerts, RSS(Really Simple Syndication) feeds (user selected), RSS feeds (curated), Stock market News (from personal portfolio), Stock market alerts (from personal portfolio), TWITTER accounts (curated), TWITTER stream (personal), YAHOO Answers (personal question and answers), YAHOO Fresh (web content from trends on Twitter), YAHOO News (by category), YAHOO! News For You, YAHOO! News friend activity (aka Social Chrome), YAHOO! content sites (Shine, OMG, Green, etc.), YAHOO Groups (personal), photos from photo-sharing sites. When selecting which items to recommend, the user PE 322 walks through each content type (starting with the one with the largest target), and tries to recommend enough items from that type that pass the relevance threshold so that the ratio is preserved. If it cannot recommend the requisite amount of a particular content type, it then readjusts the target percentages of the remaining content types so as to maintain their relative ratios. Furthermore, as the user provides positive or negative feedback for an item of a given content type, its percentage is adjusted upwards or downwards by a small amount, so that for example, interacting positively with a given type will increase its prevalence in the items recommended. There are both minimum and maximum limits on the percentages, so no one type comes to dominate the stream of recommended items.

At 816, a target number of items for each of the item types can be selected to forward to the user based on the item type weights and the number of new content items requested by the user as described herein. Based on the item weight associated with each content type, a ratio of the number of content items of each type to be included in the mixture of item types forwarded to the user is determined. Again, as described herein various content items including public and private data such as emails, new items, alerts, advertisements, social networking feeds and input from other selected sources can be included in the content sent to the user. Thus, if the target ratio to include a particular type of content in the resultant items list to be forwarded to the user is less, there will be less number of that particular type of content items in the resultant items list forwarded to the user. Conversely, if the target ratio to include a particular type of content in the resultant items list to be forwarded to the user is higher, there will be more of that particular type of content items in the resultant items list forwarded to the user.

The resultant items list with the selected number of each item type is forwarded or transmitted to the user as a seen items list as shown at 818. In an embodiment, it can happen that the number of new content items 'X' determined to be relevant to the user upon rescoring at 806 is less than the number of new content items 'N' requested by the user. In this case, either only the relevant new content items 'X' as requested by the user are displayed to the user on a user device or a combination of the 'X' relevant new content items and top 'N-X' content items previously viewed by the user can be displayed to the user.

Figure 9:
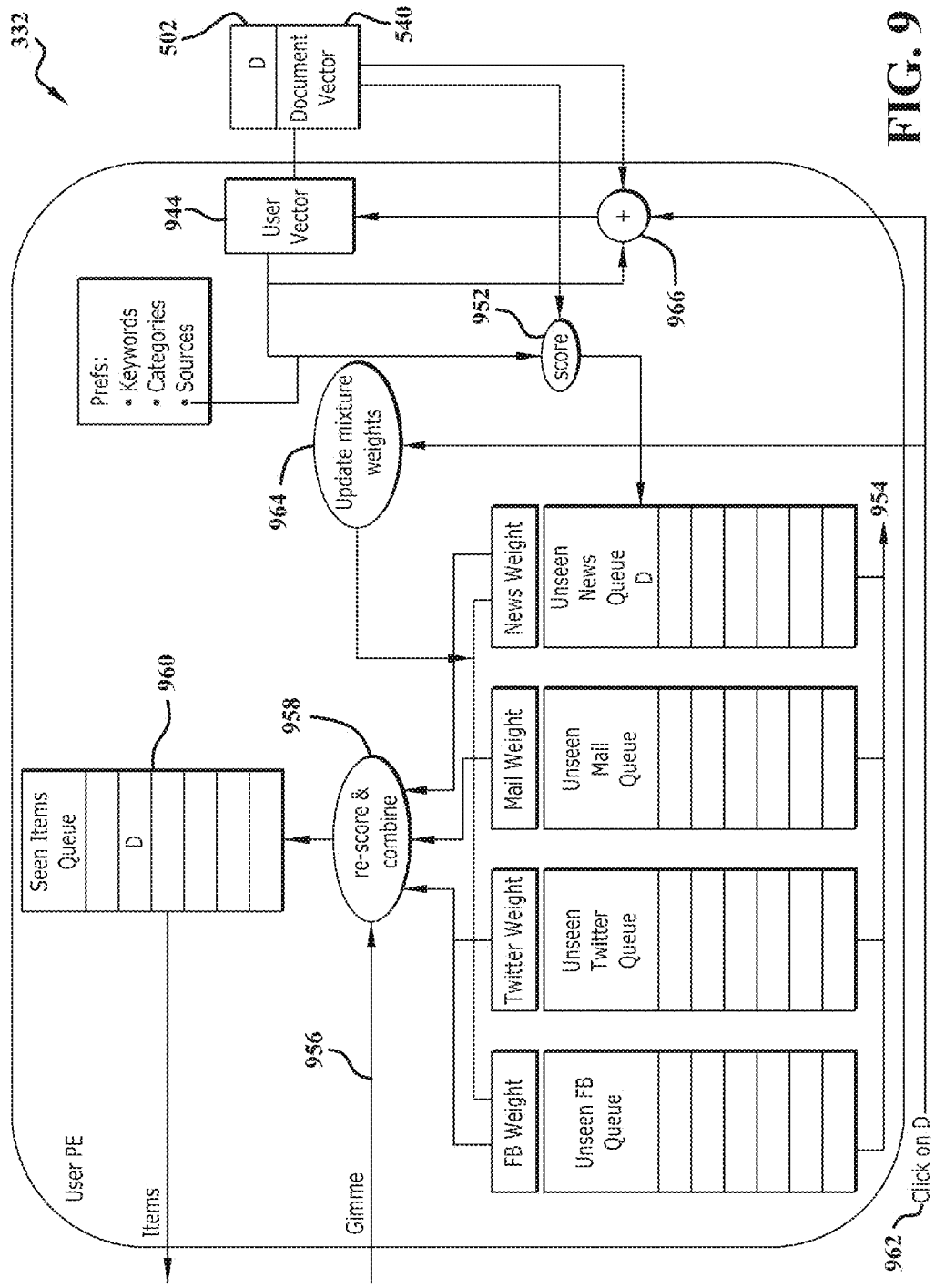
FIG. 9 is a schematic figure showing the processes executed by a user PE in accordance with one embodiment.

FIG. 9 is a schematic figure showing the processes executed by a user PE 332 in accordance with one embodiment. The user PE 332 upon receiving a vector representation of a content item D, scores the content item D for its relevance to the user in real time as shown at 952. In particular, a modified dot product of a vector representation 540 of the content item D 502 is obtained in combination with the user vector 944 as shown at 952. The resultant of the operation at 952 includes the user vector 944 which represents the user in combination with user preferences including but not limited to keywords, categories and sources. Additionally, metadata related to current user context such as date/time/user location obtained for example, via GPS (Global Positioning System) coordinates cellular, triangulation/positioning or IP (Internet Protocol) address can also be employed to determine relevance of the content item D 502 to the current user context. If the received content item D 502 is determined to be relevant, it is added to one of the unseen item lists 954. For example, if the item D 502 is a news item which is determined to be relevant to the user it is added to the unseen news queue. As shown in FIG. 9, each of the item types has a respective unseen items queue in addition to being associated with a particular item mixture weight. Thus, the news item type has a respective item mixture weight associated therewith. When a request for content, for example, in the form of a 'gimme' gesture is received from the user as shown at 956, the various items from the different item queues 954 are rescored in accordance with respective weights and combined as shown at 958. In this instance depicted in FIG. 9, content item D 502 is found to be relevant upon rescoring at 958 and accordingly, it is forwarded for display to the user in the seen items queue 960.

If the user, upon receiving the content item D 502 in the seen queue 960, clicks on it, the click event 962 is received by the user PE 332 and used as a feedback to update item mixture weights in real time as shown at 964. In one embodiment, as the item D 502 was a news type item, the News Weight associated with the news content type is increased so that subsequent seen item lists forwarded to the user will be biased to include a greater number of news type items. Conversely, if the user had not clicked on the content item D 502, such information is also received by the user PE 332 and employed to update the mixture weights 964 so that less number of content items of the content type that remained un-selected by the user are included in the subsequent seen lists that are forwarded to the user.

Additionally, the feedback regarding the user selection of the content item D 502 is employed in updating the user vector in real time as shown at 966. Thus, actions that the user takes on items translate into real-time feedback using a standard technique called Rocchio feedback, wherein the item's vector, in this instance vector 540 is added or subtracted from the user vector 944 after multiplying it by some weight. If the user clicks on the content item D 502, the user vector 944 is combined with the representation of the content item D 502, the information regarding the click event, for example, the temporal metadata associated with the click event, and the user preferences in order to recalculate the user vector. Therefore, each time a user selects an item of content, the event generated by such selection affects the user model 3324 in real time. In an embodiment, the selection information of the user can also affect other user models which are similar to the user model 3324 so that the content items forwarded to the other users are also affected in real-time. In an embodiment, in addition to being updated in real-time, the user vector can also be updated on a periodic basis, for example every twenty four hours, as will be detailed further herein.

In addition to updating the user model 3324, the feedback regarding the user click events can also be employed for content discovery. For example, any new terms that get added to a user's model 3324 as a result of feedback immediately (in real-time) cause their user PEs to re-evaluate any item in the recommendations module 210 that contains one of the new terms. This has the effect of making the recommendations module 210 extremely responsive to the user's current interests, by recommending related items to what the user has just read or otherwise interacted with. Furthermore, actions taken by individual users on publicly available items are noted by the Item PE, which resends itself to all interested users for rescoring, for example, via the users list associated with the various feature PEs which include that particular item in their list of items. And because the aggregate actions of other users of the recommendations module 210 are also used when scoring an item, this can result in, for example, more popular items being more likely to get recommended as they become more popular. Also, whenever the user model changes, items that have previously passed the threshold for recommendation are re-scored to ensure they still pass.

Figure 10:
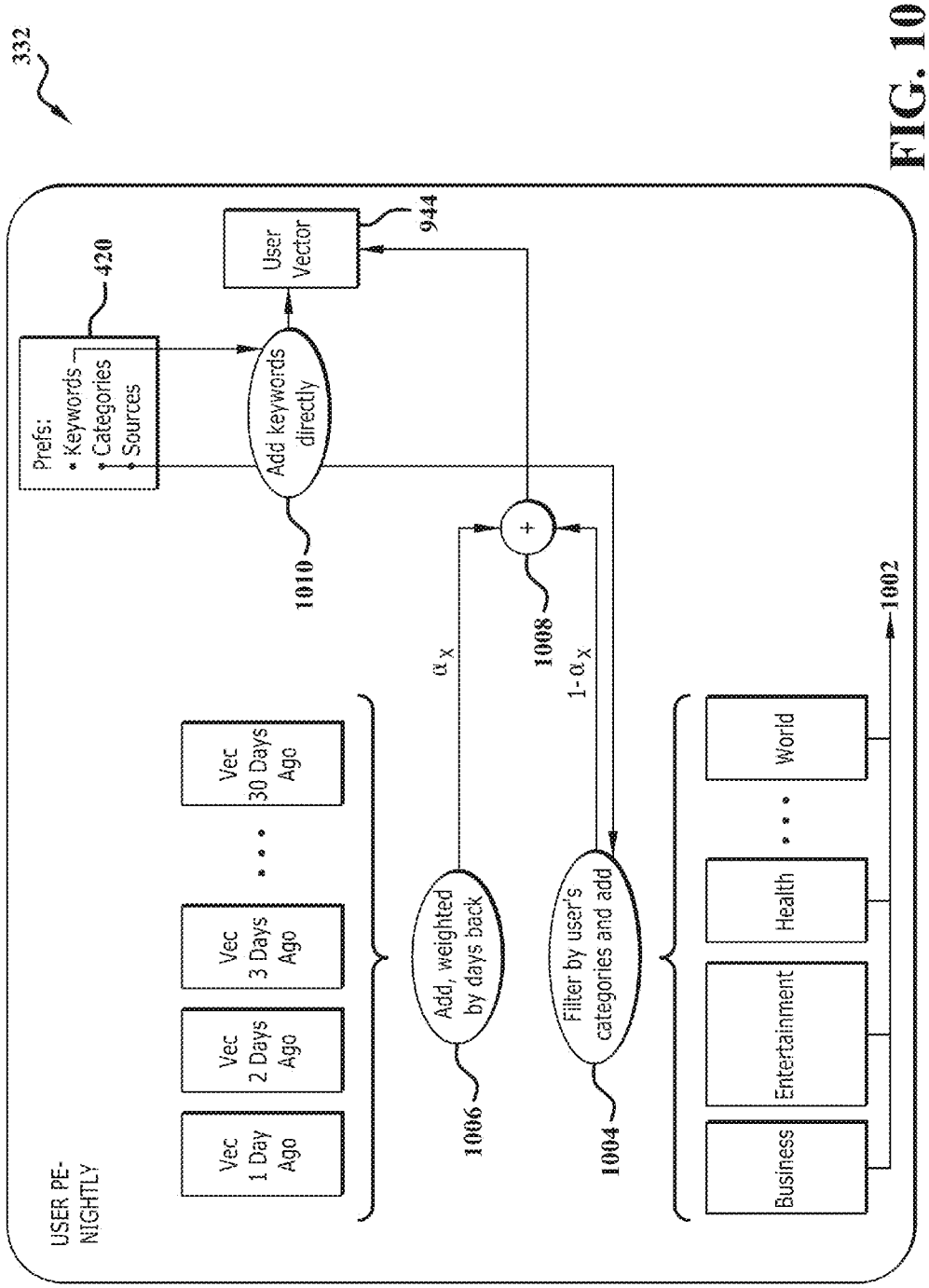
FIG. 10 is a schematic diagram that illustrates a procedure of updating the user PE on a periodic basis in accordance with one embodiment.

FIG. 10 is a schematic diagram that illustrates a procedure of updating the user PE on a periodic basis, for example, on a nightly basis. As discussed herein, all category-level vectors for content categories that a user has selected are aggregated and this aggregate is assigned as the initial user model. Accordingly, the user PE 332 includes content categories 1002 that are explicitly declared by the user for example, as shown in the user preferences 420, or are implicitly derived as being of interest to the user via various user actions and/or input from other related users or users with similar interests. A few content categories such as business, entertainment, health and world news categories are shown to be included in the user PE 332 by the way of illustration and not limitation. On a periodic basis, for example, on a nightly basis, the features such as word/terms which are included in the categories 1002 in addition the content items from the sources specified in the user preferences 420 are folded or added to the user vector 944 as shown at 1004. By folding in the cold-start model or the latest version of the categories included in the user PE 332 on an continuing basis, the recommendations module 210 ensures that content on new topics is recommended to the user associated with the user PE 332, especially as new topics are always being created.

In addition to being updated with the cold start category vectors on a periodic basis, the user vector 944 is additionally aggregated with weighted user vectors over the previous thirty days as shown at 1006. Snapshots of the user model are obtained on a periodic basis (for example, daily), and kept for some time into the past. When folding the cold-start model in, an aggregate of the user's model over the past (weighted exponentially for example, to emphasize recent user models) is also folded in. In this way, long-term interests are kept in the user's model, so that even if they haven't interacted with an item with a particular term recently, it won't completely drop out of their model from lack of reinforcement. Accordingly, the user vectors of the user PE 332 of the last thirty days weighted by days back are obtained and combined with the current version of cold start category vectors in order to obtain the updated user vector 944 as shown at 1008 and as given by Expression (1) supra. The recommendation module 210 records what the user is interested in and exploits this information so that more content that is aligned to the user's interests is recommended. Saving the user vectors on a daily basis, and then rolling them back into the next day's user vector, allows for incorporation of short-term interests while also not forgetting long-term interests. This also ensures that short-term interests (caused by spiking news events) do not overwhelm a user vector. Therefore, the updated user vector 944 is a combination of the cold start category vectors of those categories selected for inclusion into the user PE 322 and the user vectors of the previous thirty days as shown at 1008. Thus, user model for the next day is:

alpha*decayed weighted sum of user model over last 30 days, plus (1-alpha)*sum of category vectors from recent News articles.

In addition to being automatically updated in real time and on periodic basis, the recommendations module 210 allows a user to manipulate the user vector 944 to include keywords directly as shown at 1010 so that the user vector 944 can be configured to better represent the user. Users can explicitly add terms to their respective user models, effectively "whitelisting" these terms. Such terms are added to the user vector with a weight of 1. Items that contain these terms are also upweighted, so that terms on the whitelist are effectively standing searches and content items comprising such terms will be weighed more favorably in comparison to other results that do not comprise such terms. Additionally, users have a "blacklist" of terms that they can edit, effectively removing these terms from their model, thus while presenting recommendations to the user, the content items comprising the blacklisted terms will be weighed unfavorably thereby greatly reducing the probability that items with these terms will be recommended. In an embodiment, UI (user interface) of the recommendations module 210 can also treat whitelist terms specially when rendering items for recommendation. For example, by highlighting these terms as ones the user has told the system are important to them. This makes it easy for the user to see items about terms they are particularly interested in. The UI also has a mode in which terms from an item are recommended to the user, who then has the option of adding them to their whitelist or blacklist. The recommended terms are selected from the corresponding item, and reflect the most salient terms from that item, including for example, a source of the content item, a location associated with the content item, or the author's name. Thus, the recommendations module 210 can operate in a "training mode" suggesting material to the user that can be used to fine-tune the user model 3324.

Figure 11A:
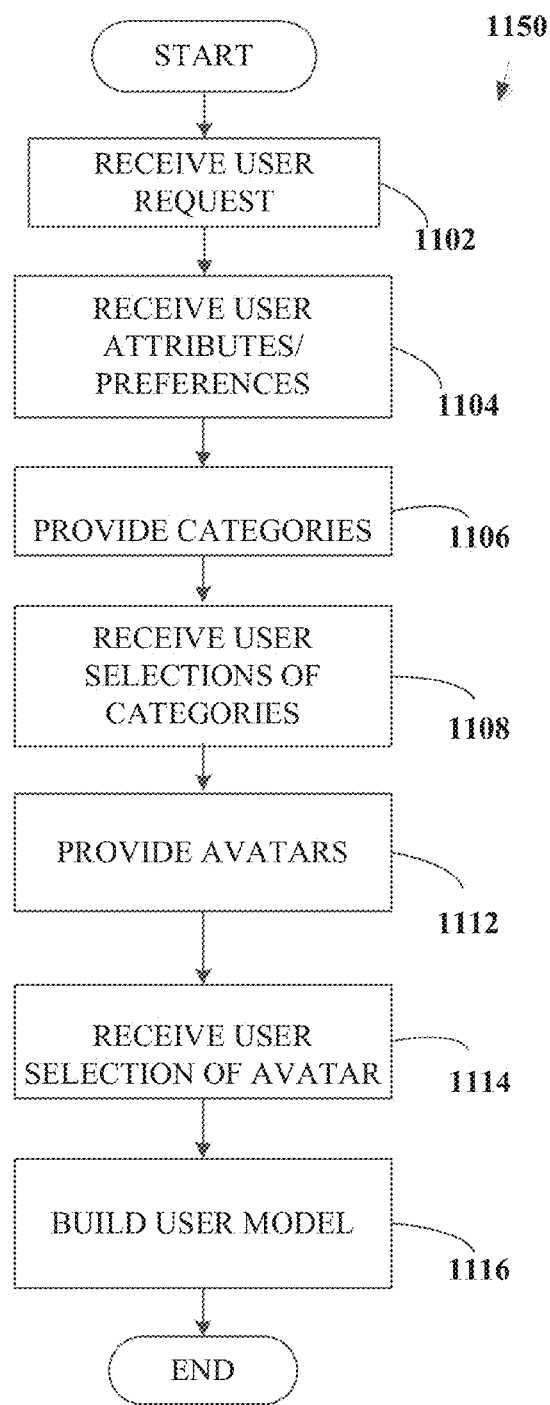
FIG. 11A shows a flow chart illustrating a method of initiating a user model in accordance with one embodiment.

FIG. 11A shows a flow chart 1150 illustrating an embodiment of a method of initiating a user model in accordance with one embodiment. The method commences at 1102 wherein a user request to register with the recommendations module 210 is received. In response to the user request, the recommendations module 210 can request and obtain information regarding the user as shown at 1104. This can include user's personal attributes such as age, sex, location and other demographic information, user's interests such as including but not limited to, keywords and entities. In addition, information regarding the sources from which the user would like to receive the updated content recommendations is also received. At 1106, the user can be provided with a list of content item categories to choose from. For example, the content categories can include news categories such as world news, entertainment news and other news categories. In one embodiment, the user can be presented with a superset of all the content item categories available for user selection within the recommendations module 210. In one embodiment, a subset of the available categories can be selected based on the information provided by the user at 1104. At 1108, the user's selections of categories are received. At 1112, various avatars are provided for user selection. In one embodiment, the avatars provided for user selection can be based on the content categories selected by the user so that the avatar personifies the user model that will be generated to reflect user's interests. At 1114, user selection of an avatar is received and the user model is generated at 1116 based on the information collected from the user at various steps of the procedure described supra. In one embodiment the category vectors, keywords, entities and other attribute information is aggregated to obtain the user model. For example, vectors of categories that the user is interested in are added and within these categories, particular keywords that the user blacklists can be subtracted to obtain a resultant user vector that models the user. Hence, the recommendations module 210 models the user in similar fashion as items which makes users and items somewhat interchangeable, a property which is exploited in a number of different ways as detailed herein.

Figure 11B:
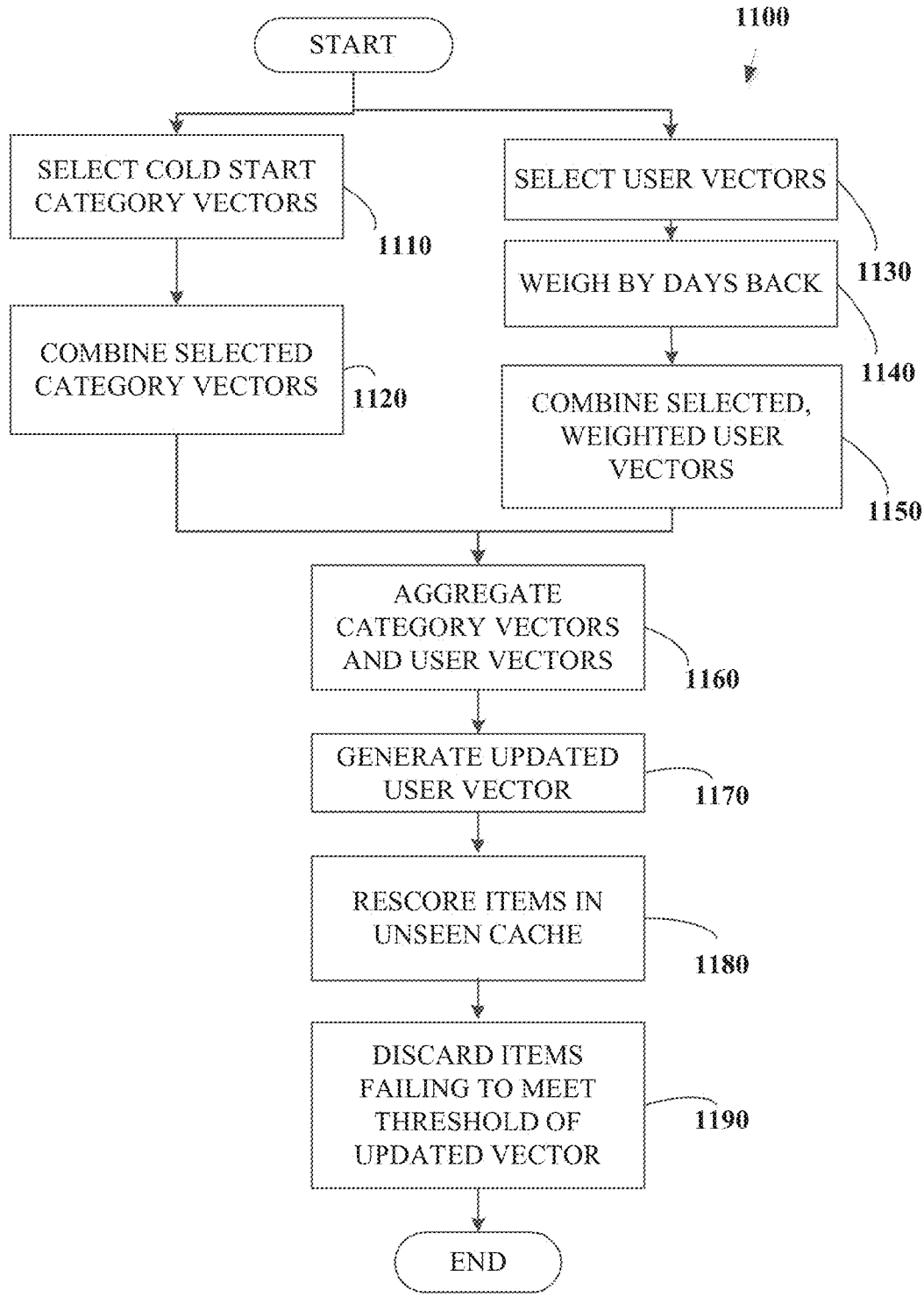
FIG. 11B shows a flowchart illustrating an embodiment of a method of updating a user vector on a periodic basis.

FIG. 11B shows a flowchart 1100 illustrating an embodiment of a method of updating a user vector on a periodic basis. The method begins at 1110 wherein the cold start vectors of the categories included in the user PE 322 are selected. They are combined as shown at 1120. Such exploration allows a user to discover content on topics they may not have previously seen. This can include trending topics. In one embodiment, a snapshot of the user vector just prior to being updated on a periodic basis can be obtained and stored. Such user vectors of the last N days can be obtained as shown at 1130. In one embodiment N is a natural number which can take one of the values 1, 2, 3 . . . . In an embodiment, the value of N can be determined dynamically and can vary based on, for example, the user attributes. In an embodiment, N=30. Each of the user vectors is combined with a weighing factor that biases the combination of the user vectors so that the latest user vector carries the greatest weight and the oldest user vector carries the least weight as shown at 1140 and such weighted user vectors of the previous thirty days are combined as shown at 1150. At 1160, the combination of the cold start category vectors obtained at step 1120 is aggregated with the combination of the weighted user vectors obtained at 1150 and an updated user vector is generated as shown at 1170. In an embodiment, whenever the user vector changes, items that have previously passed the threshold for recommendation are re-scored to ensure that they still satisfy the relevance threshold for the user in view of the updated user vector. Generally items that have passed the relevance threshold and are not yet transmitted to the user are stored in unseen items list as described herein. Therefore, the items in the unseen items list are rescored at 1180 in order to determine that they are relevant to the updated user vector. Those that satisfy the relevance threshold are retained in the unseen items cache whereas those that fail to fulfill the relevance threshold are discarded as shown at 1190.

Figure 12A:
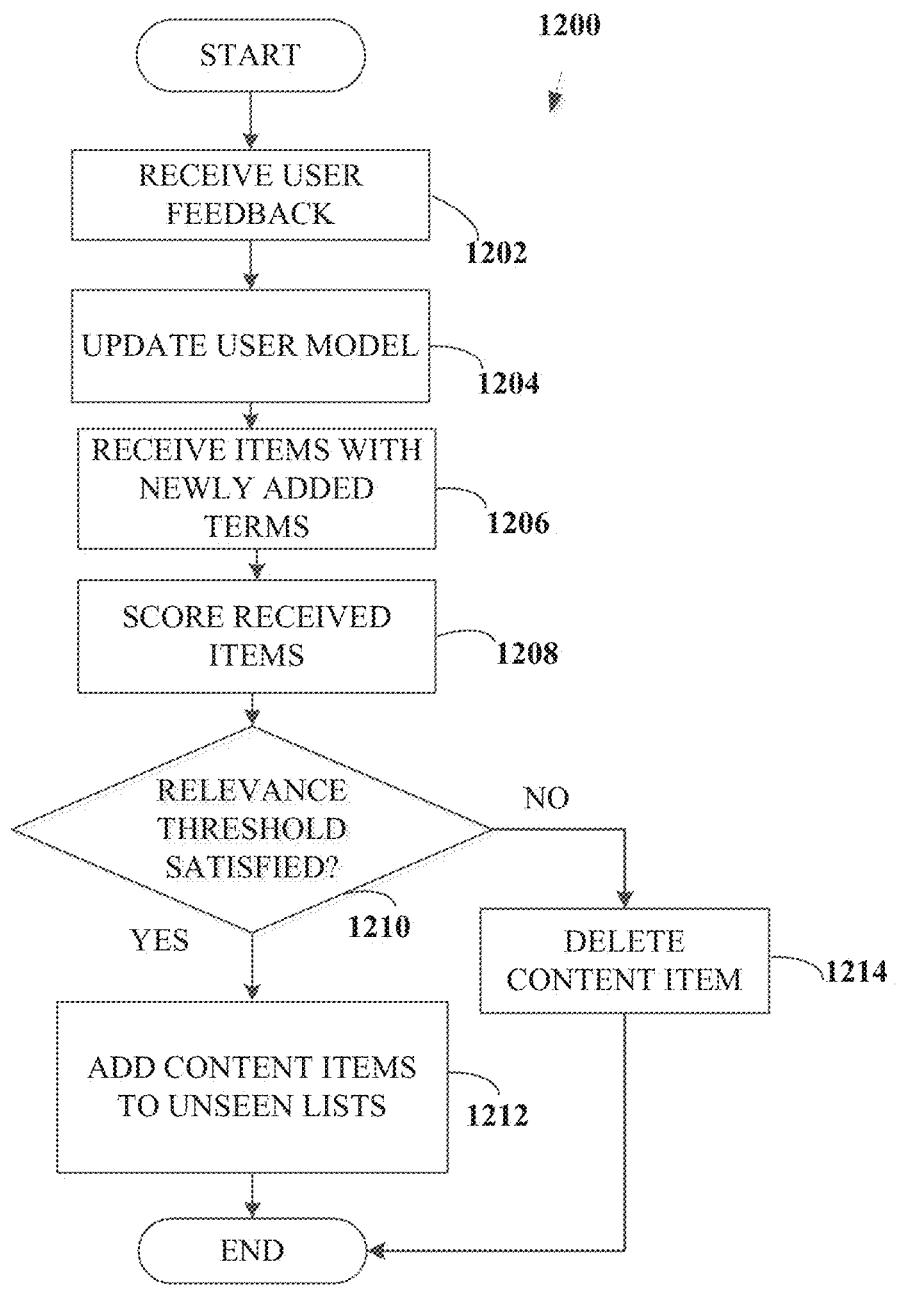
FIG. 12A shows a flowchart illustrating a method of updating user recommendations based on user feedback in accordance with an embodiment.

FIG. 12A shows a flowchart 1200 illustrating an embodiment of a method of updating user recommendations based on user feedback. The method begins at 1202 wherein the user feedback is received. The user feedback can comprise a user click on a content item in order to view the content item. It can also comprise additional user actions such as but not limited to, forwarding the content item to other contacts, voting for or against the content item or providing comments in response to the content item. Upon receiving the feedback, new terms associated with that particular content item can be obtained and the user model can be updated as shown at 1204. The new terms can be obtained, for example, from the item PE associated with the content item. New content items associated with the newly added terms are obtained at 1206. The user model can obtain the new content items, for example, via the list of content items comprised within the feature PEs associated with the newly added terms. The content items received at step 1206 are scored at 1208 in order to determine their relevance to the user who is providing the feedback in accordance with embodiments described herein. At 1210, the determined relevance is compared to the relevance threshold for the user. If the content item satisfies the threshold relevance at 1210, it is added to the unseen items list as shown at 1212 to be further processed upon receiving a user request in accordance with embodiments described herein. If the content item does not satisfy the relevance threshold at 1210, it is discarded as shown at 1214 and the procedure terminates on the end block. It can be appreciated that the incorporation of the user feedback into the recommendations provided to the user can occur in real-time. Thus, the process described in FIG. 12A can occur in real-time so that the list of unseen items varies from one user request or one user click of the 'gimme' button to the next click.

Figure 12B:
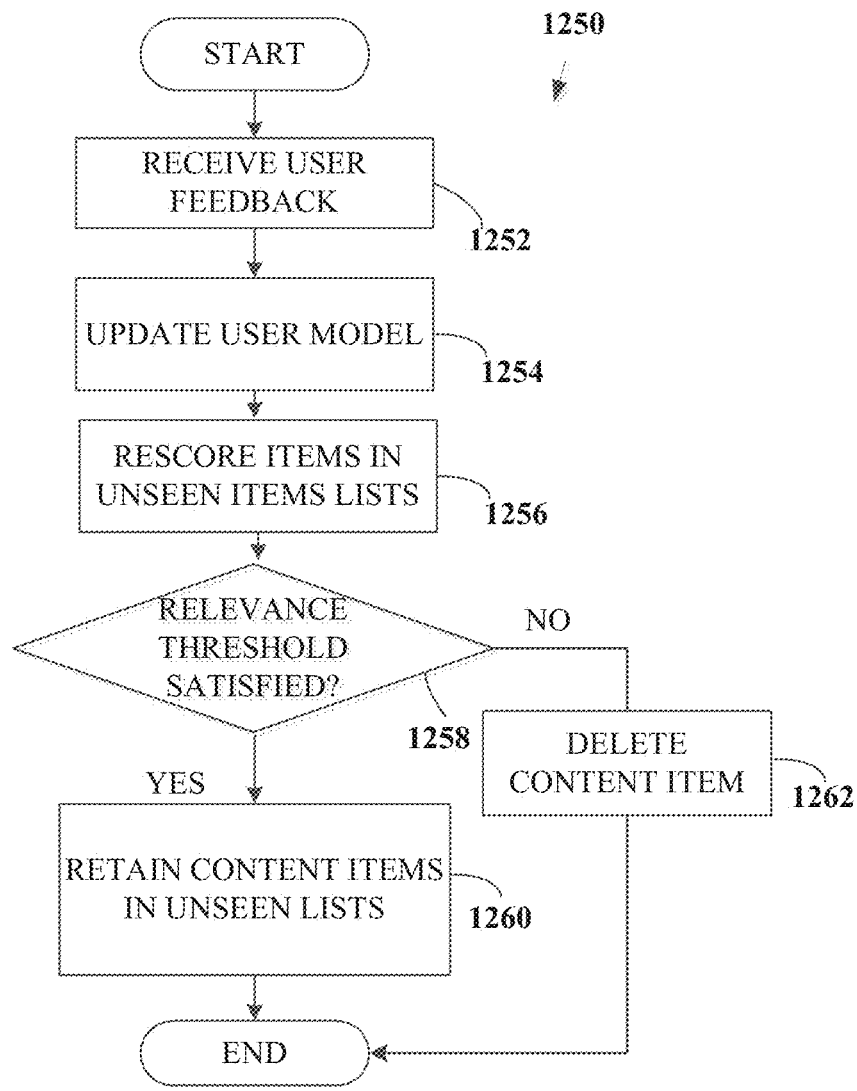
FIG. 12B shows a flowchart illustrating an embodiment of a method of updating user recommendations based on user feedback.

FIG. 12B shows a flowchart 1250 illustrating an embodiment of a method of updating user recommendations based on user feedback. The method begins at 1252 wherein the user feedback is received. Upon receiving the feedback, new terms associated with that particular content item can be obtained and the user model is updated with the new terms as shown at 1254. The new terms can be obtained, for example, from the item PE associated with the content item. The content items added to the unseen items lists in the respective user PE are rescored to determine an updated relevance score in view of the updated user model as shown at 1256. At 1258, the newly determined relevance score is compared to the relevance threshold for the user. If the content item satisfies the relevance threshold at 1258, it is remains in the unseen items list as shown at 1260 to be further processed upon receiving a user request in accordance with embodiments described herein. If the content item does not satisfy the relevance threshold at 1258, it is discarded as shown at 1262 and the procedure terminates on the end block. It can be appreciated that the incorporation of the user feedback into the recommendations provided to the user can occur in real-time.

In an embodiment, user PEs of different users can send messages to each other. A direct comparison of two user models using a similarity measure describe herein can result in a recommendation that users connect to each other, either on one of the client services (TWITTER, FACEBOOK etc.) or within the recommendations module 210. If the users already have established a connection within the recommendations module 210, user A could "follow" user B, with the result being that any publicly available recommendations that user B's User PE recommends are also sent to user A's User PE for evaluation and possible recommendation.

Figure 13:
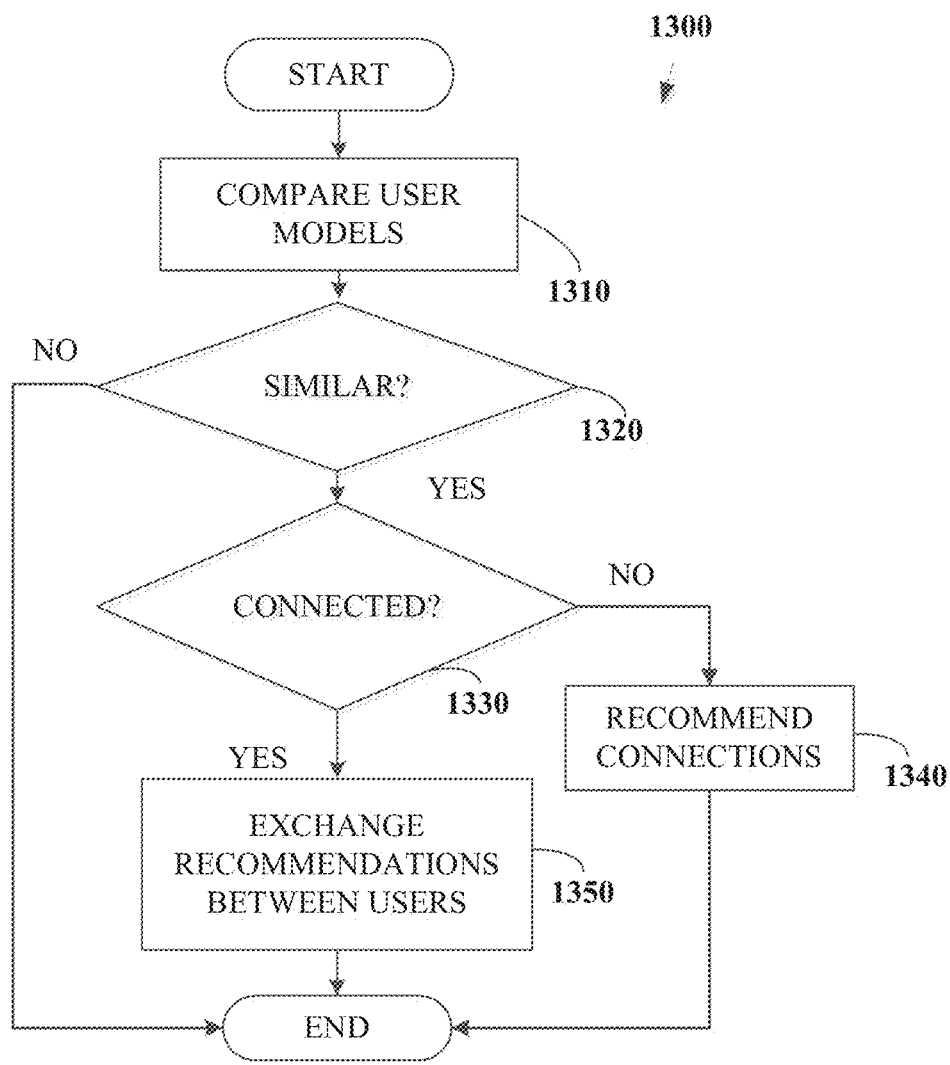
FIG. 13 is a flow chart illustrating an embodiment of a method of providing user recommendations based on similarity between user models.

FIG. 13 is a flow chart 1300 illustrating an embodiment of a method of providing user recommendations based on similarity between user models. The method begins at 1310 wherein two user models are compared. This comparison can occur, for example, when a user selects certain category vectors to be included into the user model. Based on such selection and/or other user attributes such as, location, age, sex, profession for example, other users who have similar category vectors in their user models can be selected for comparison. At 1320, it is determined if the two user models are similar based on embodiments described herein. In an embodiment, techniques such as cosine similarity measure can be employed to make the similarity determination at 1320. If the two user models are not similar the procedure terminates on the end block. If it is determined at 1320 that there is sufficient similarity between the two user models, it is determined at 1330 if the two users are connected within the recommendations module 210. If the two users are not connected, then a message can be sent at 1340 suggesting that the users connect within the recommendations module 210 or any other social network of the users' choice and the procedure terminates on the end block. If it is determined at 1330 that the users are connected, the content item recommendations made by the users to their social contacts or the content items indicated as being of interest to the users are exchanged at 1350. Therefore, users with similar user models can be sources of content recommendations within the recommendations module 210.

Figure 14:
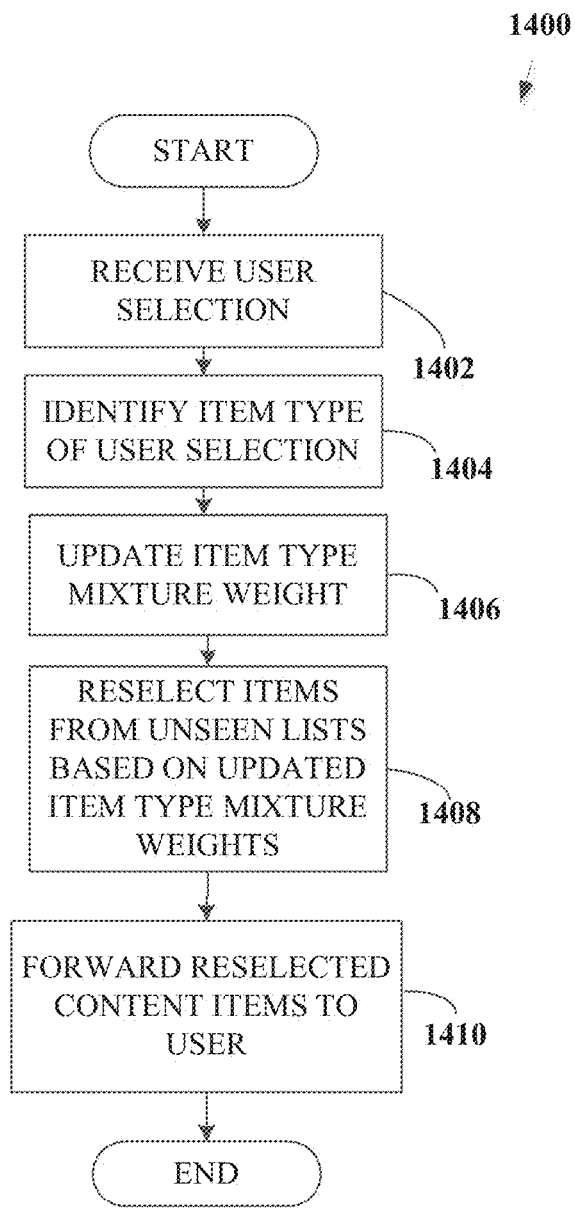
FIG. 14 is a flow chart illustrating a method of updating user recommendations in real time in response to received user feedback in accordance with an embodiment of the present disclosure.

FIG. 14 is a flow chart 1400 illustrating an embodiment of a method of updating user recommendations in real time in response to received user feedback. As described supra, the user PE 332 receives events associated with user actions, such as user clicks on particular content items forwarded to them. In one embodiment, the user PE 332 can incorporate feedback from such user actions and update content recommendations provided to the user in real-time. The method commences at 1402 with the user PE receiving the feedback, for example, a user click on a particular content item. At 1404, the type of content item selected by the user is determined and the item type mixture weight associated with that content type is updated as shown at 1406. In one embodiment, the item type mixture weight of the particular type of content selected by the user is increased and correspondingly, the item type mixture weights of other content types can be decreased so that the ratio the content type selected by the user in the overall content transmitted to the user is increased. At 1408, content items from the unseen items lists are re-selected based on the updated item type mixture weights. An updated content stream is transmitted to the user as shown at 1410. In an embodiment, the procedure of receiving the user feedback and updating the content recommendations can occur in real-time so that by just clicking or selecting a particular content item from the recommended contents can cause the content recommendations to be updated.

Figure 15A:
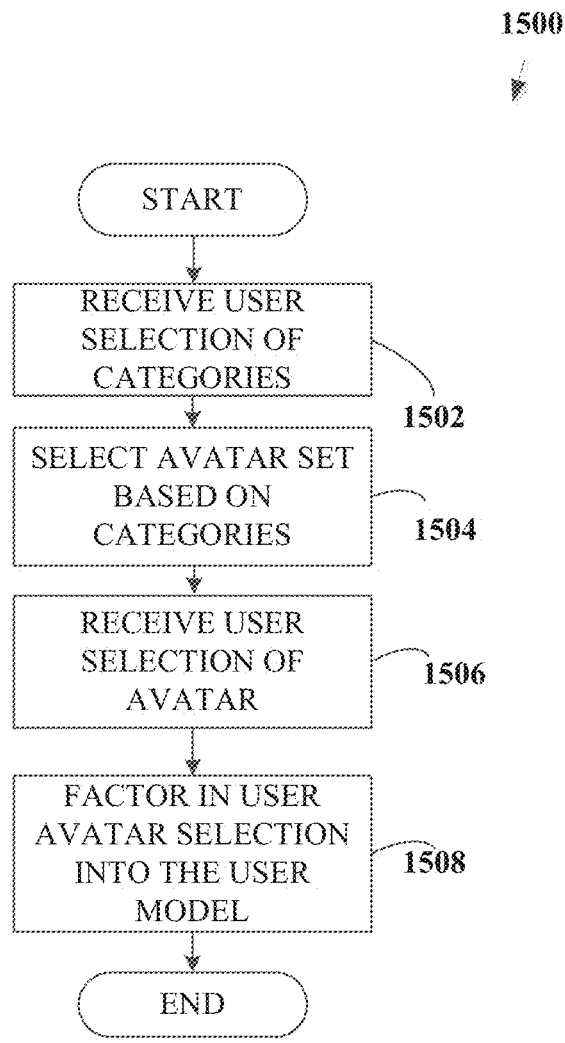
FIG. 15A shows a methodology that details the procedure of generating the avatar in accordance with an embodiment of the present disclosure.

In the context of the recommendations system 100, an avatar is a graphical image of a person or other animated or anthropomorphized object that represents the user model 3324. In an embodiment it acts as a bridge between the user and their otherwise opaque model 3324. In an embodiment, the avatar is selected by the user while initially configuring the recommendations module 210 and a selection of the avatar can be factored into building the user model 3324. FIG. 15A shows an embodiment of a methodology 1500 that details the procedure of generating the avatar. As detailed supra, when a user initially registers with the recommendations module 210, a set of content categories is presented to the user for selection. Based on the user selection of content categories, a set of avatars can be presented for user selection as shown at 1504. In an embodiment, the set of avatars presented to the user can be a subset of all the avatars available within the recommendations module 210 for user selection. At 1506, a user selection of one of the avatars is received. In an embodiment, the avatar can be employed to allow the user to interact with the user model 3324 thereby removing at least some of the veil of obscurity about the model 3324. In fact, the avatar is employed within the recommendations module for providing help to the user with various tasks as will be detailed further herein. At 1508, the user selected avatar is factored into the user model 3324 either while generating the user model 3324 or while updating the user model 3324. Therefore, the avatar is not only affected by the user model but also affects the user model 3324 in accordance with the embodiments described herein.

Figure 15B:
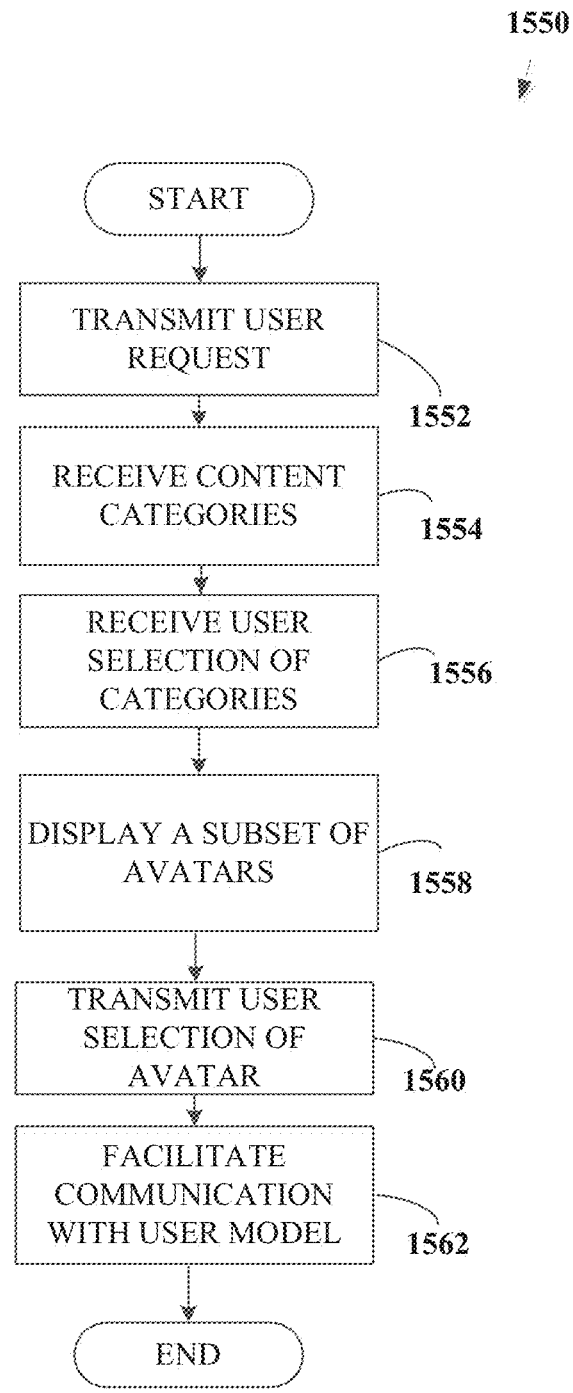
FIG. 15B shows a methodology that details the procedure of generating the avatar in accordance with an embodiment of the present disclosure.

FIG. 15B shows an embodiment 1550 of methodology executable by a processor of, for example, a client device 202/204 generating an avatar in accordance with one embodiment. The method begins at 1552 wherein a user request for content recommendations from the recommendations module is transmitted by the processor. At 1554, a plurality of content categories for user selection are received by the processor from the recommendations module 210. At 1556 at least a subset of the categories selected by the user are received and at 1558 a subset of avatars for selection by the user, are displayed wherein the subset of avatars are indicative of the user selected categories. A user selection of an avatar from the subset of avatars is received at 1560 and thereby communication from a user model associated with the avatar to the user via the avatar is facilitated by the processor as shown at 1562, for example, by displaying messages from the user model on a display associated with the client device 202/204.

FIG. 16 depicts an embodiment, wherein the avatar 1602 is employed to act as a help agent, providing hints on how to best use and customize various aspects of the recommendations module 210, in the form of messages. As described supra, the user model 3324 is able to process the events generated from the user actions. As the avatar 1602 is tied to the user model 3324, the avatar can provide contextual help in real-time by monitoring user actions. In FIG. 16, the avatar 1602 generates three different messages 1610, 1620 and 1630 based on the context and user actions. In fact, based at least one the messages 1610, 1620 and 1630 different buttons 1640 can be displayed appropriately to the user. For example, at 1610, the avatar advises the user of the whitelist functionality available within the recommendations module 210 wherein certain terms can be added to the user model as standing searches wherein content comprising the whitelisted terms is retrieved and presented to the user as it is received by the recommendations module 210. Accordingly, a graduation cap button 1650 is displayed which allows the user to begin training the user model 3324 as will be detailed further infra. In response to the message 1610, the user has whitelisted some terms, and content which is retrieved in response to such standing search queries has been presented. At 1620, the avatar advises the user of the highlighted terms in the content being the whitelisted terms or standing search queries. It further advises on how to change the terms if they are not to the user's liking. Further at 1630, if the user is receiving too much content associated with the standing search queries, the user model 3324 is able to identify such a situation and sends a context sensitive or contextual message via the avatar 1602 about the removal of the whitelisted terms. Based on the user response to the contextual messages, the standing search queries can be updated. Therefore, the user can add/remove and/or edit the standing searches instituted by the user model 3324 via exchange of contextual messages with the avatar 1602. Thus, the avatar 1602 is able to personify the user model 3324 to the users and is able to act as an interface through which the user model 3324 is able to communicate with the user.

As mentioned above, a "training mode" recommends terms for the user to whitelist or blacklist—the avatar is featured in this mode in order to make it clear that the user's actions are directly affecting their model. FIG. 17 is depicts a schematic diagram of an avatar being employed when the user model 3324 is operating in a training mode. In particular, FIG. 17 shows a message from the avatar 1702 suggesting the addition of terms to standing searches. Accordingly, a training mode button 1650 is displayed. When the user clicks on the "training mode" button 1650, a pop-up 1710 appears that allows the user to take the suggested actions to train their user model 3324. As seen from FIG. 17, the pop up allows the user to add new terms or remove existing terms from the user model 3324 by clicking the + or − buttons respectively. It can be appreciated that the pop-up 1710 is shown only for illustration and is by no means limiting. In different embodiments, other methodologies or other user interface elements can be employed to update/edit the user model 3324.

Figure 18A:
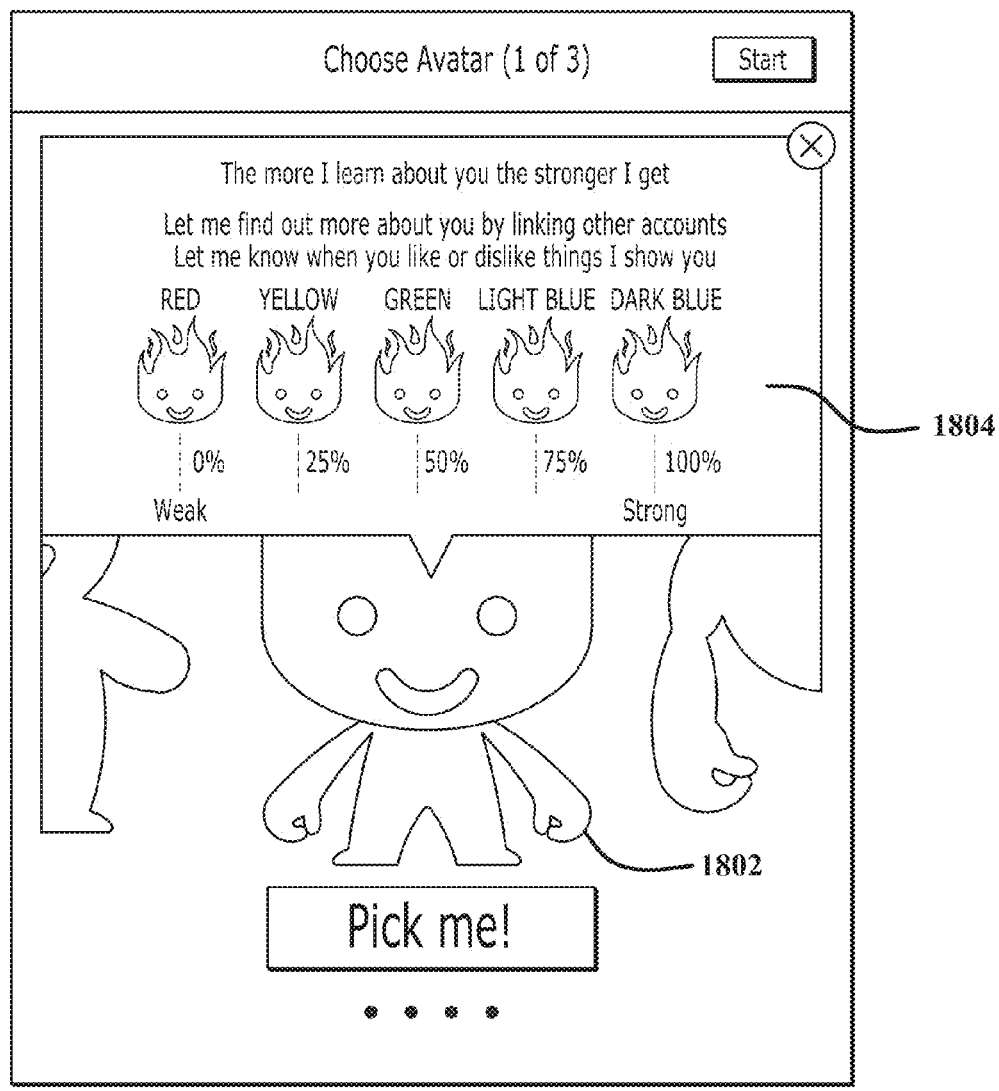
FIG. 18a shows an avatar informing the user about how it can become healthy and the various levels of health in accordance with an embodiment of the present disclosure.

An avatar can have different levels of "health" (which are rendered in the avatar's image, as well as elsewhere) depending on the user's engagement level with the recommendations module 210, as well as their level of customization of the recommendations module 210. FIG. 18a shows an avatar 1802 from a subset of avatars presented for user selection in accordance with embodiments described herein. In addition to urging the user to select it for representing the user model 3324 via the "Pick me!" button, the avatar also informs the user about how it can become healthy with time via the user interaction and the various levels of health 1804 it has associated therewith in accordance with embodiments described herein. In one embodiment, the health level of the avatar is indicated via its color. The avatar 1802 can be initially colored in shades of black or white and/or grey indicating a neutral state or a state wherein its health level is not yet set as the user model 3324 is still being configured. In an embodiment, different health levels of the avatar 1802 can correspond to the different colors of the visible spectrum for example, with red being associated with lowest health and each color in the spectrum being associated with a progressively increasing health of the avatar 1802. Thus, for a user who is just beginning to use the recommendations module 210 and whose user model 3324 is fairly new, the avatar can be colored red. However, it can gradually change in intensity and eventually transform into a different color with increasing time and frequency of the user interaction with the user model 3324.

In another embodiment, the avatar 1802 health can be indicated via only a single color but the intensity of the color can indicate the health of the avatar 1802. For example, a healthy avatar will be vividly colored indicating a user who interacts frequently with the recommendations module 210 and is actively involved in developing the respective user model. Another user who does not interact as frequently with the recommendations module 210 and seldom provides feedback may have an avatar of the same color as the frequent user, but the occasional user's avatar can be associated with a dull shade which is less intense than that of the frequent user.

Figure 18B:
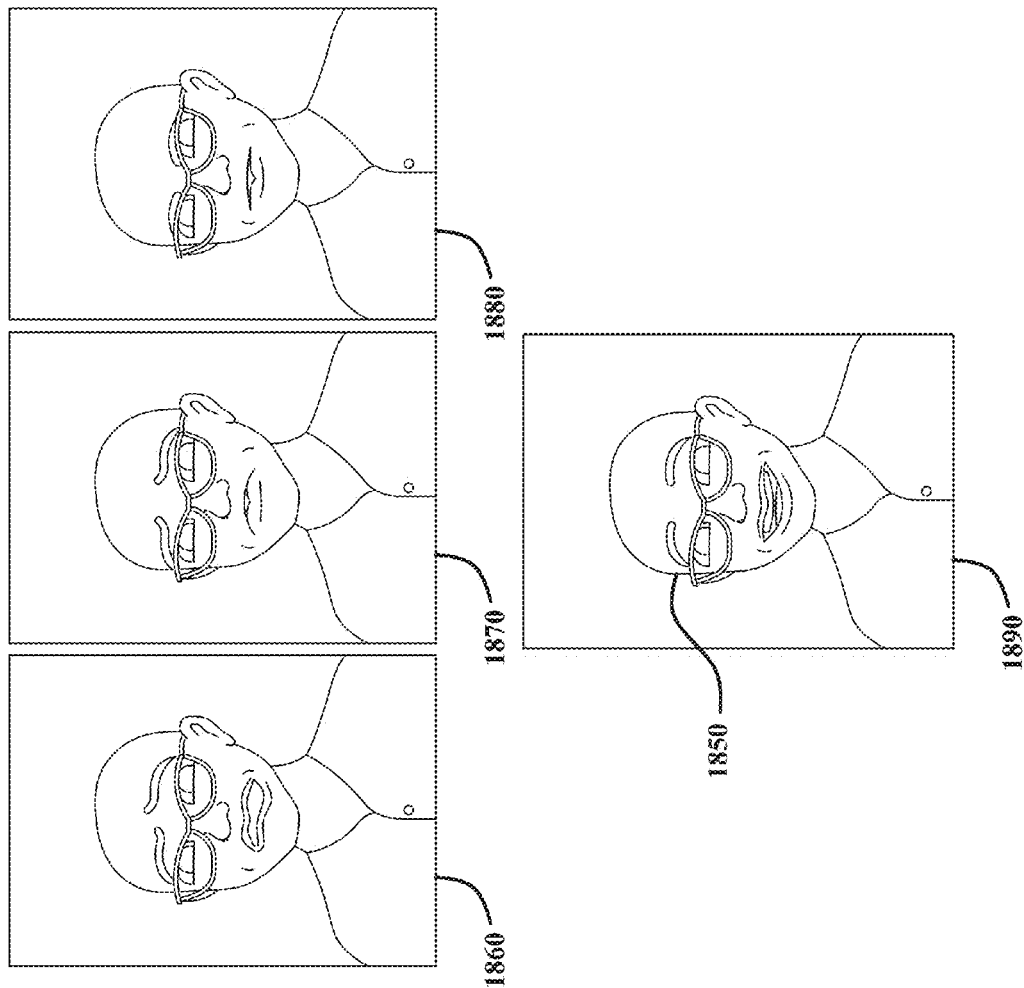
FIG. 18b shows various facial expressions associated with an avatar in accordance with embodiments of the present disclosure.

FIG. 18b shows various facial expressions associated with the avatar 1850 by the way of illustration and not limitation. In an embodiment, the different facial expressions of the avatar can be associated with the various levels of health associated with the corresponding user model. The sad expressions 1860 and 1870 of the avatar indicate that it is not healthy. In one embodiment, the health level/facial expression can indicate that the corresponding user is an occasional user of the recommendations module 210 who infrequently provides feedback or who does not have enough number of accounts/content streams associated with the recommendations module 210 and thereby is not providing enough information about himself/herself to the user model. In one embodiment, this can be the expression of an avatar at the initial stages of the user interaction with the recommendations module 210. But eventually as the user interacts more frequently with the recommendations module 210 and gets more involved with customizing the user model 3324 by providing explicit input or implicit feedback via various actions, the expression of the avatar can brighten up to display a more cheerful countenance as shown at 1880 and finally at 1890 the expression indicates a very healthy avatar associated with or personifying a user model whose user is involved with the recommendations module 210 and provides plenty of information for customizing the user model.

Figure 19:
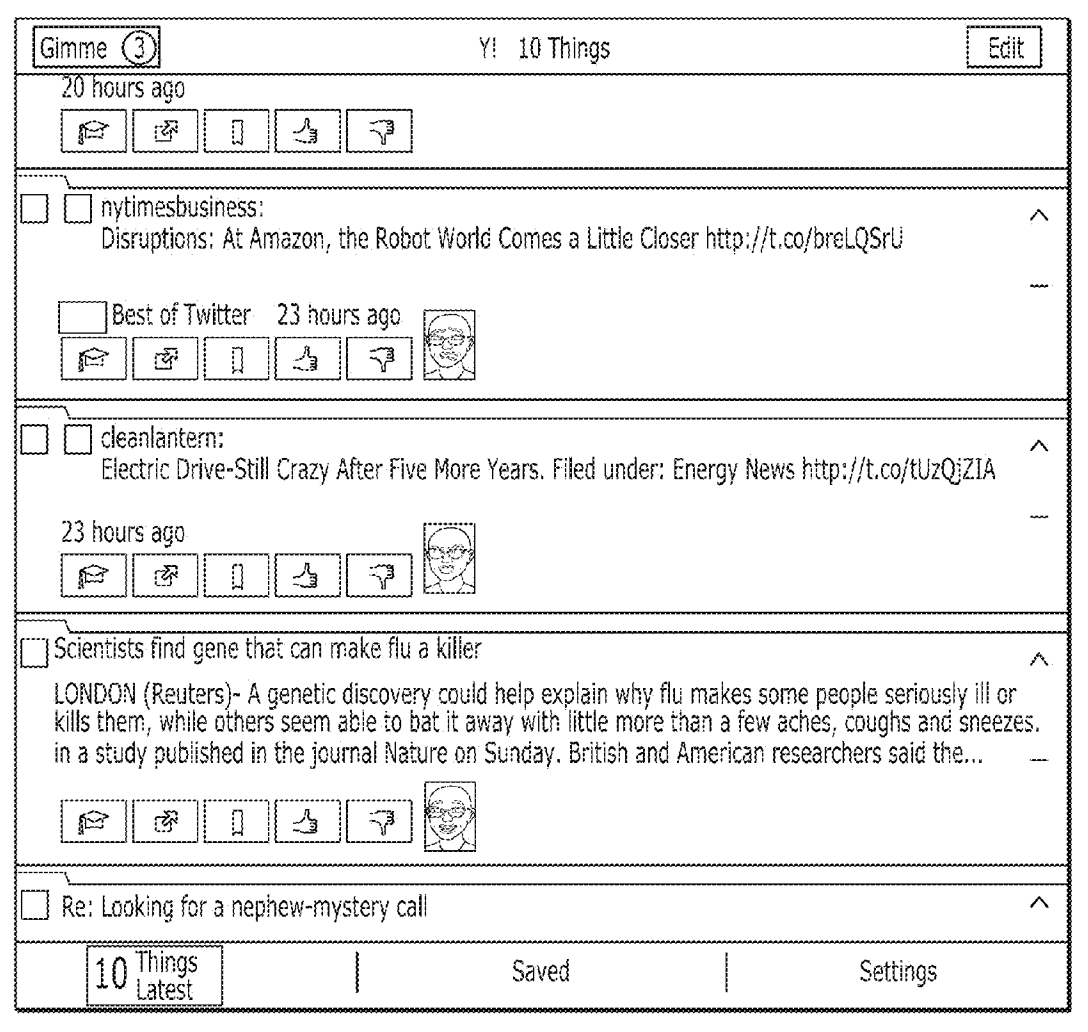

In one embodiment, the avatar can likewise reflect the emotional sentiment of the content. In this case, the avatar's facial expression, or other way of rendering the avatar such as, for example, different colors, or other visual treatment can indicate sentiment. FIG. 19 shows a depiction of an embodiment wherein various expressions of the avatar 1850 reflect various emotions in response to different content. As mentioned supra, different types of content is rendered and the expression of the avatar associated with a particular content type will depend on the exact content in the content item and in an embodiment, the expression of the avatar for a particular content item can be selected based on the user's likes/dislikes. In an embodiment, only content item associated with public data sources, such as news sources, or blogs that are freely available will have a related avatar displayed therewith whereas private content can be displayed without the avatar. In an embodiment, the avatar can reflect the user's likely reaction to a particular news item. In this context, it can be appreciated that while two users who select the same avatar may generally react similarly to a particular content item, it is also possible that they may react differently to different content items. Accordingly, their avatars can reflect different expressions for the same content item indicating the subtle differences that may exist in their user models. In an embodiment, the expressions of the avatars can be selected by processing the content via natural language processing techniques, analyzing the content with sentiment analysis tools and/or analyzing the content in context of the user information available with the user model 3324 and identifying a graphic of the avatar from a predetermined set of images, with the appropriate expression.

Figure 20A:
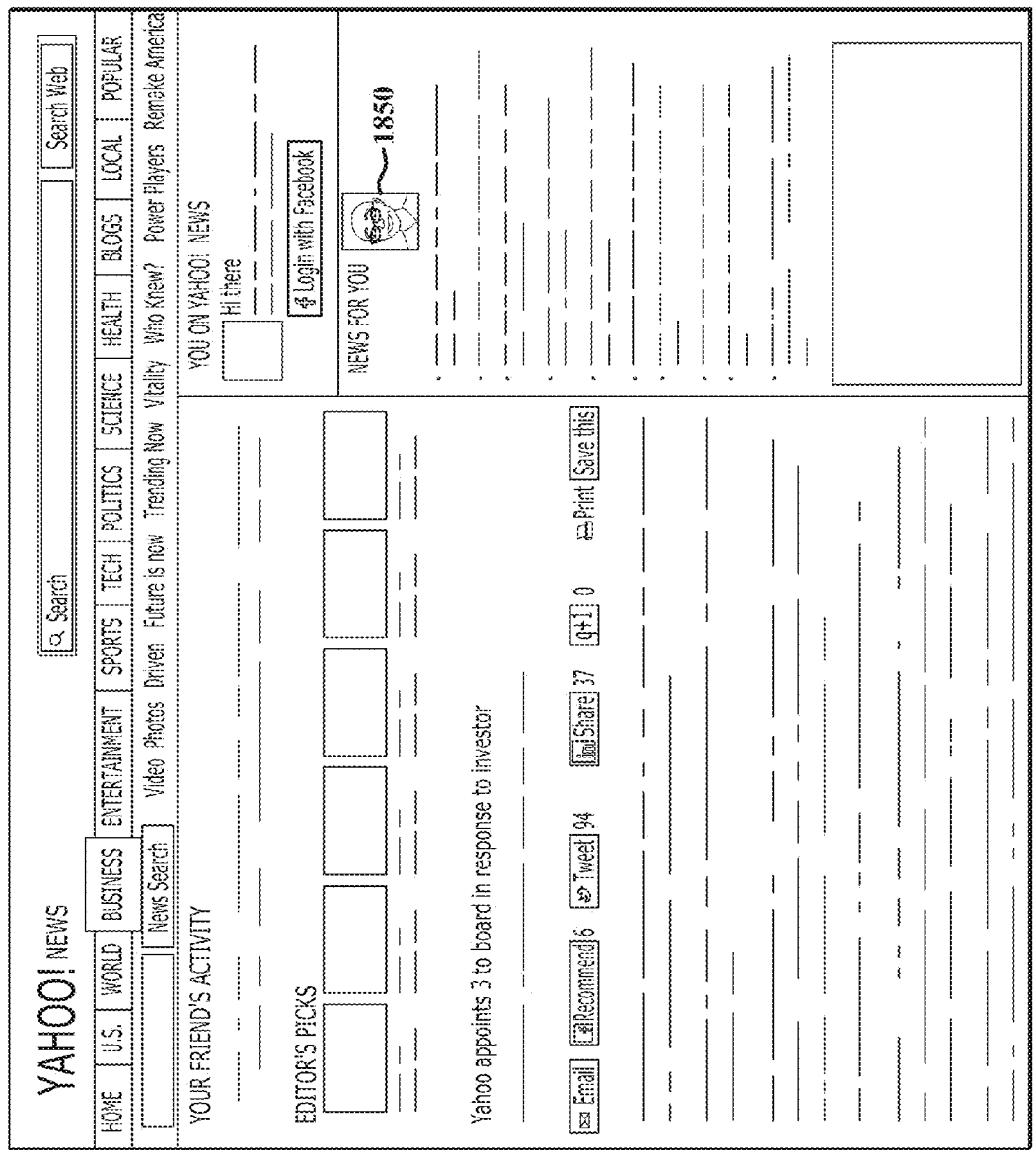
FIG. 20A depicts an embodiment wherein the avatar is rendered on an online content being viewed by a user.

As a representative of the user's recommendation model 3324, the avatar could travel with the user across the web. In this context, a representation of the avatar can communicate to the user where and when content is being personalized or not. FIG. 20A depicts an embodiment wherein the avatar 1850 is rendered on an online content being viewed by a user. The type of rendering can be a visual indication of whether or not the associated content has been personalized. In an embodiment, a full-color and/or smiling avatar as shown in FIG. 20A indicates the content is personalized.

Figure 20B:
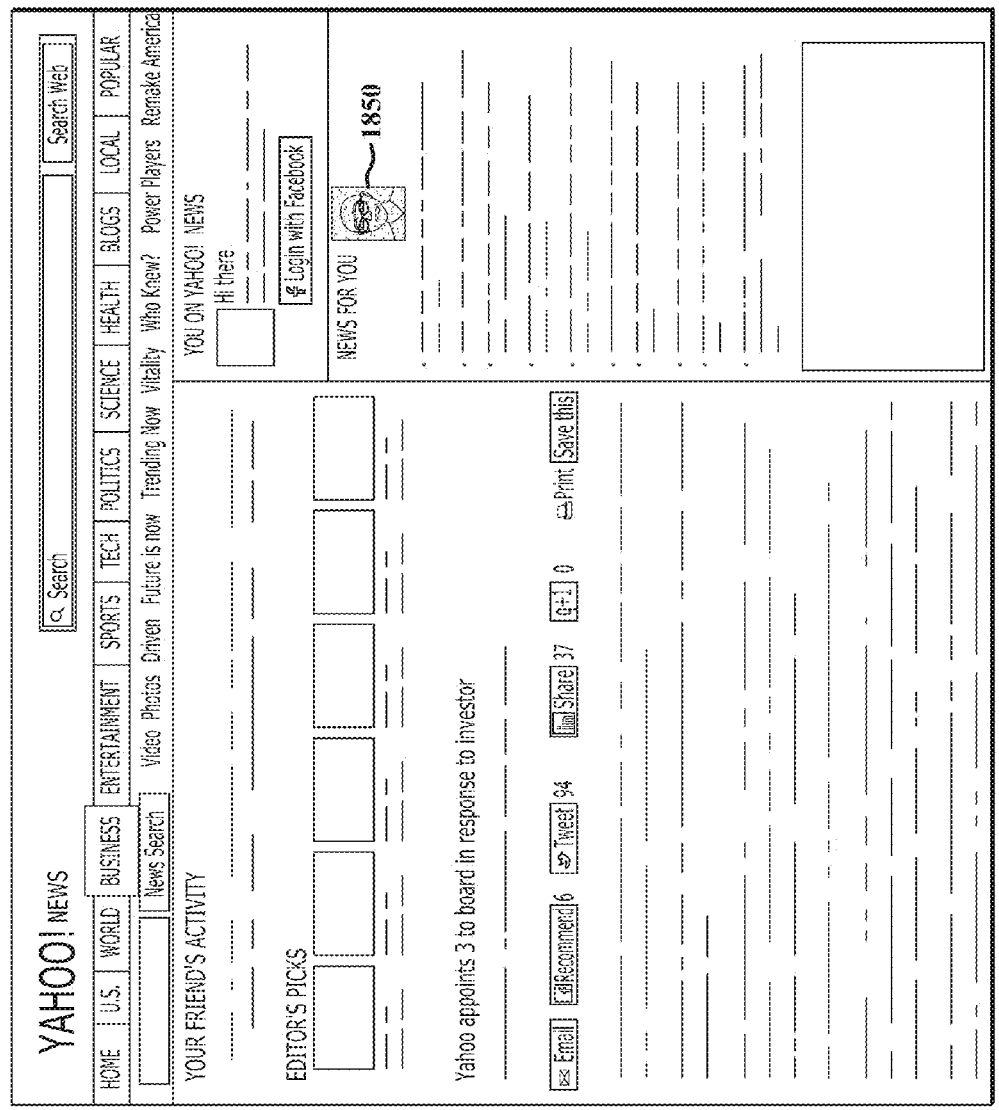
FIG. 20B depicts an embodiment wherein the avatar is rendered on an online content being viewed by a user.

FIG. 20B depicts an embodiment wherein the avatar 1850 is rendered in an online content item being viewed by a user. In this embodiment, the avatar 1850 appears grayed-out and/or with a neutral expression indicating that the content is not personalized. In an embodiment, the user can interact with (e.g., click) the avatar 1850 to toggle between personalized and non-personalized content thereby changing the rendition of the avatar 1850 with the associated content.

Figure 21:
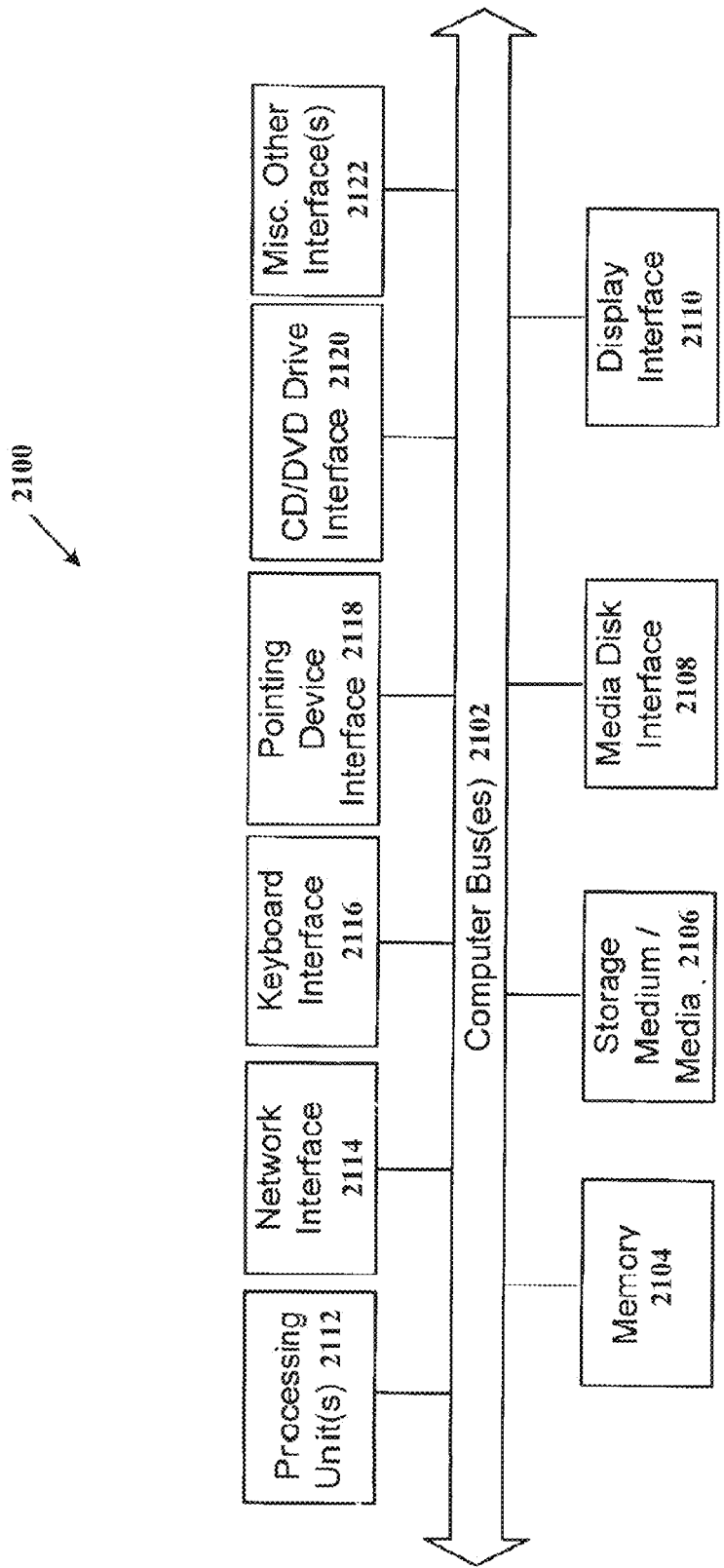
FIG. 21, internal architecture of a computing device includes one or more processing units (also referred to herein as CPUs), which interface with at least one computer bus in accordance with one embodiment of the present disclosure.

As shown in the example of FIG. 21, internal architecture of a computing device 2100 includes one or more processing units (also referred to herein as CPUs) 2112, which interface with at least one computer bus 2102. Also interfacing with computer bus 2102 are persistent storage medium/media 2106, network interface 2114, memory 2104, e.g., random access memory (RAM), run-time transient memory, read only memory (ROM), etc., media disk drive interface 2108, an interface 2120 for a drive that can read and/or write to media including removable media such as floppy, CD-ROM, DVD, etc., media, display interface 2110 as interface for a monitor or other display device, keyboard interface 2116 as interface for a keyboard, pointing device interface 2118 as an interface for a mouse or other pointing device, and miscellaneous other interfaces 2122 not shown individually, such as parallel and serial port interfaces, a universal serial bus (USB) interface, and the like.

Memory 2104 interfaces with computer bus 2102 so as to provide information stored in memory 2104 to CPU 2112 during execution of software programs such as an operating system, application programs, device drivers, and software modules that comprise program code, and/or computer-executable process steps, incorporating functionality described herein, e.g., one or more of process flows described herein. CPU 2112 first loads computer-executable process steps from storage, e.g., memory 2104, storage medium/media 2106, removable media drive, and/or other storage device. CPU 2112 can then execute the stored process steps in order to execute the loaded computer-executable process steps. Stored data, e.g., data stored by a storage device, can be accessed by CPU 2112 during the execution of computer-executable process steps.

Persistent storage medium/media 2106 is a computer readable storage medium(s) that can be used to store software and data, e.g., an operating system and one or more application programs. Persistent storage medium/media 2106 can also be used to store device drivers, such as one or more of a digital camera driver, monitor driver, printer driver, scanner driver, or other device drivers, web pages, content files, playlists and other files. Persistent storage medium/media 2106 can further include program modules and data files used to implement one or more embodiments of the present disclosure.

Figure 22:
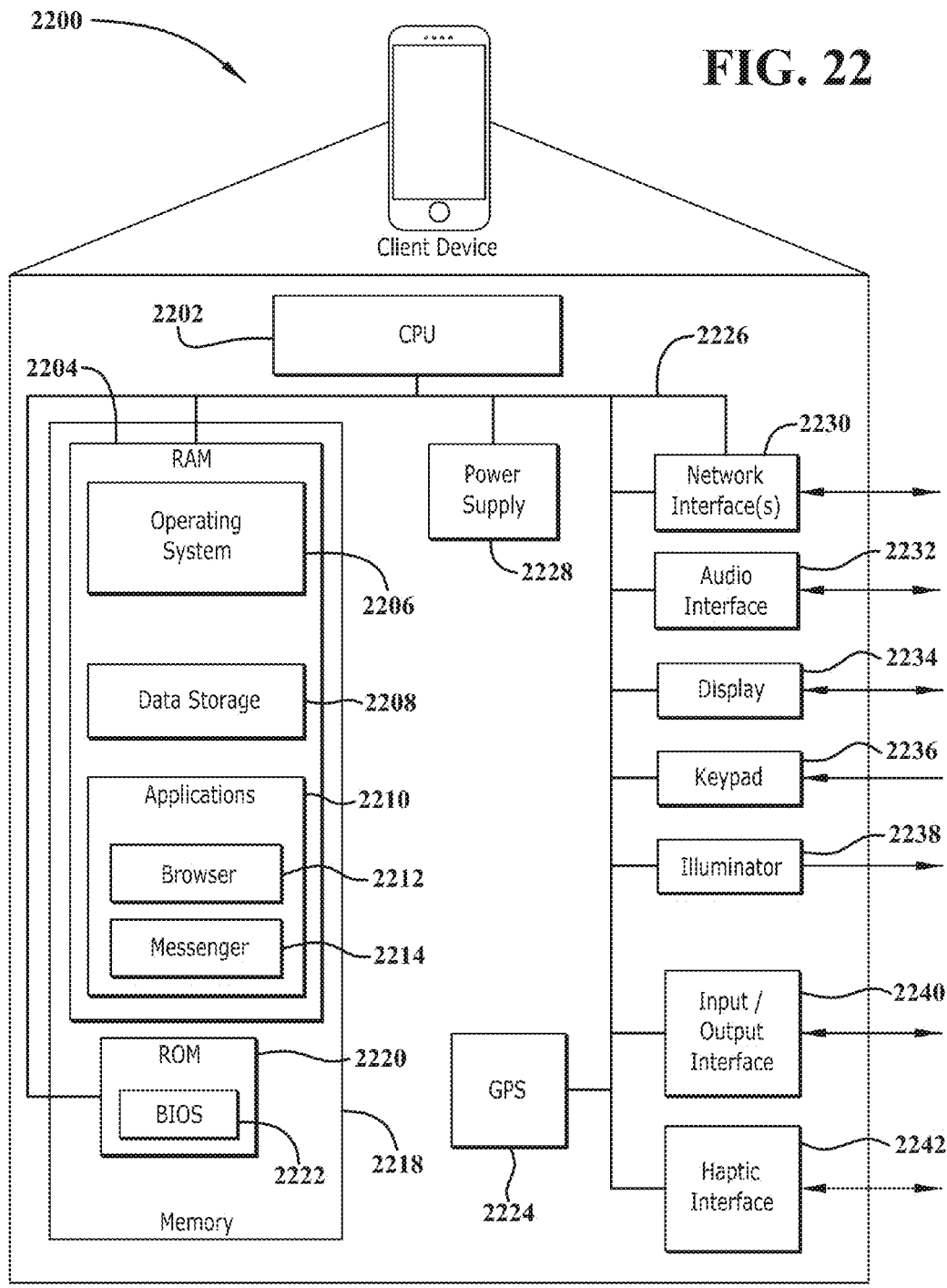
FIG. 22 is a schematic diagram illustrating a client device implementation of a computing device in accordance with embodiments of the present disclosure.

FIG. 22 is a schematic diagram illustrating a client device implementation of a computing device in accordance with embodiments of the present disclosure. A client device 2200 may include a computing device capable of sending or receiving signals, such as via a wired or a wireless network, and capable of running application software or "apps". A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. The client device can include standard components such as a CPU 2202, power supply 2228, a memory 2218, ROM 2220, BIOS 2222, network interface(s) 2230, audio interface 2232, display 2234, keypad 2236, illuminator 2238, I/O interface 2240. Claimed subject matter is intended to cover a wide range of potential variations. For example, the keypad 2236 of a cell phone may include a numeric keypad or a display 2234 of limited functionality, such as a monochrome liquid crystal display (LCD) for displaying text. In contrast, however, as another example, a web-enabled client device 2200 may include one or more physical or virtual keyboards 2236, mass storage, one or more accelerometers, one or more gyroscopes, global positioning system (GPS) 2224 or other location identifying type capability, Haptic interface 2242, or a display with a high degree of functionality, such as a touch-sensitive color 2D or 3D display, for example. The memory 2218 can include Random Access Memory 2204 including an area for data storage 2208.

A client device may include or may execute a variety of operating systems 2206, including a personal computer operating system, such as a Windows, iOS or Linux, or a mobile operating system, such as iOS, Android, or Windows Mobile, or the like. A client device 2200 may include or may execute a variety of possible applications 2210, such as a client software application 2214 enabling communication with other devices, such as communicating one or more messages such as via email, short message service (SMS), or multimedia message service (MMS), including via a network, such as a social network, including, for example, Facebook, LinkedIn, Twitter, Flickr, or Google+, to provide only a few possible examples. A client device 2200 may also include or execute an application to communicate content, such as, for example, textual content, multimedia content, or the like. A client device 2200 may also include or execute an application 2212 to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
receiving, at a content recommendation server, a user request for content recommendations;
providing, by the content recommendation server, a plurality of content categories for user selection;
receiving, by the content recommendation server, at least a subset of the content categories selected by the user;
automatically analyzing, via the content recommendation server, a set of avatars based on information associated with at least said subset of the content categories, said analysis comprising , and based on analysis, selecting, via the content recommendation server, a subset of avatars that correspond to said subset of content categories;
providing, by the content recommendation server, the subset of avatars to the user, said providing causing the subset of avatars to be displayed on a device of the user;
receiving, by the content recommendation server, a user selection of an avatar from the subset of avatars;
automatically associating, by the content recommendation server in response to said receiving of the user selection, the selected avatar to a respective user model of the user, said user model comprising an automatically determined and normalized feature vector computed by the content recommendation server that represents digital information associated with current content consumption activity by the user on a network, said association of the selected avatar comprising automatically updating, via the content recommendation server, the user model based on features of the selected avatar;
further updating, via the content recommendation server, the updated user model based on exchanged communication between the user and the selected avatar, said further updating comprising continuously updating the user model based on each interaction the user has with the selected avatar, each interaction comprising the content recommendation server causing the user device displaying the selected avatar to automatically generate and automatically send a message to the content recommendation server, the generated message comprising information associated with electronic feedback provided by the user respective to the avatar;
determining, by the content recommendation server, a health level of the selected avatar based on the generated message received by the content recommendation server, the health level of the selected avatar indicative of an amount of the feedback of the user;
further updating, via the content recommendation server, the user model based on the health level; and
communicating, via the content recommendation server, digital content to the user based on the further updated user model.

2. The method of claim 1, further comprising:
receiving, by the content recommendation server, search terms for whitelisting from the user via exchange of messages between the user and the avatar;
generating, by the content recommendation server, standing search queries for each of the whitelisted terms.

3. The method of claim 2, further comprising:
monitoring, by the content recommendation server, user feedback to content retrieved by the standing search queries; and
providing, by the content recommendation server, contextual messages to the user via the avatar based on the user feedback.

4. The method of claim 3, further comprising:
updating, by the content recommendation server, the standing search queries based on user response to the contextual messages.

5. The method of claim 1, further comprising:
selecting, by the content recommendation server, a color for the avatar based at least on the health level of the avatar.

6. The method of claim 1, further comprising:
selecting, by the content recommendation server, an expression for the avatar based at least on the health level of the avatar.

7. The method of claim 1, further comprising:
selecting, by the content recommendation server, an expression of the avatar associated with an item of content based on a sentiment of the item of content.

8. The method of claim 1, further comprising:
configuring, by the content recommendation server, the avatar based on inclusion of personalized content in a webpage.

9. The method of claim 1, wherein determining the health level of the avatar further comprises:
indicating, by the content recommendation server, a healthy avatar if the user of the respective user model is a frequent user, else
indicating, by the content recommendation server, an unhealthy avatar.

10. A content recommendation server comprising:
a processor;
a non-transitory computer-readable storage medium for tangibly storing thereon program logic for execution by the processor, the program logic comprising:
logic executed by the processor for receiving, at the content recommendation server, a user request for content recommendations;
logic executed by the processor for providing, by the content recommendation server, a plurality of content categories for user selection;
logic executed by the processor for receiving, by the content recommendation server, at least a subset of the content categories selected by the user;
logic executed by the processor for automatically analyzing, via the content recommendation server, a set of avatars based on information associated with at least said subset of the content categories, said analysis comprising, and based on analysis, selecting, via the content recommendation server, a subset of avatars that correspond to said subset of content categories;
logic executed by the processor for providing, by the content recommendation server, the subset of avatars to the user, said providing causing the subset of avatars to be displayed on a device of the user;
logic executed by the processor for receiving, by the content recommendation server, a user selection of an avatar from the subset of avatars;
logic executed by the processor for automatically associating, by the content recommendation server in response to said receiving of the user selection, the selected avatar to a respective user model of the user, said user model comprising an automatically determined and normalized feature vector computed by the content recommendation server that represents digital information associated with current content consumption activity by the user on a network, said association of the selected avatar comprising automatically updating, via the content recommendation server, the user model based on features of the selected avatar;
logic executed by the processor for further updating, via the content recommendation server, the updated user model based on exchanged communication between the user and the selected avatar, said further updating comprising continuously updating the user model based on each interaction the user has with the selected avatar, each interaction comprising the content recommendation server causing the user device displaying the selected avatar to automatically generate and automatically send a message to the content recommendation server, the generated message comprising information associated with electronic feedback provided by the user respective to the avatar;
logic executed by the processor for determining, by the content recommendation server, a health level of the selected avatar based on the generated message received by the content recommendation server, the health level of the selected avatar indicative of an amount of the feedback of the user;
logic executed by the processor for further updating, via the content recommendation server, the user model based on the health level; and
logic executed by the processor for communicating, via the content recommendation server, digital content to the user based on the further updated user model.

11. The device of claim 10, further comprising:
search term receiving logic, executed by the content recommendation server, for receiving search terms for whitelisting from the user via exchange of messages between the user and the avatar;
search query generating logic, executed by the content recommendation server, for generating standing search queries for each of the whitelisted terms.

12. The device of claim 11, further comprising:
monitoring logic, executed by the content recommendation server, for monitoring user feedback to content retrieved via the standing search queries; and
providing logic, executed by the content recommendation server, for providing contextual messages to the user via the avatar based on the user feedback.

13. The device of claim 12, further comprising:
updating logic, executed by the content recommendation server, for updating the standing search queries based on user response to the contextual messages.

14. The device of claim 11, further comprising:
sentiment selecting logic, executed by the content recommendation server, for selecting an expression of the avatar based at least on a sentiment of a content item when the avatar is associated with the content item.

15. The device of claim 11, further comprising:
content personalization recognition logic, executed by the content recommendation server, for recognizing personalized content and configuring the avatar based on a personalization of the content.

16. A non-transitory computer readable storage medium, having stored thereon, processor-executable instructions, that when executed by a content recommendation server, perform a method comprising:
receiving, at the content recommendation server, a user request for content recommendations; providing, by the content recommendation server, a plurality of content categories for user selection; receiving, by the content recommendation server, at least a subset of the content categories selected by the user;
automatically analyzing, via the content recommendation server, a set of avatars based on information associated with at least said subset of the content categories, said analysis comprising, and based on analysis, selecting, via the content recommendation server, a subset of avatars that correspond to said subset of content categories;
providing, by the content recommendation server, the subset of avatars to the user, said providing causing the subset of avatars to be displayed on a device of the user;
receiving, by the content recommendation server, a user selection of an avatar from the subset of avatars;

automatically associating, by the content recommendation server in response to said receiving of the user selection, the selected avatar to a respective user model of the user, said user model comprising an automatically determined and normalized feature vector computed by the content recommendation server that represents digital information associated with current content consumption activity by the user on a network, said association of the selected avatar comprising, automatically updating, via the content recommendation server, the user model based on features of the selected avatar;

further updating, via the content recommendation server, the updated user model based on exchanged communication between the user and the selected avatar, said further updating comprising, continuously updating, the user model based on each interaction the user has with the selected avatar, each interaction comprising the content recommendation server causing the user device displaying the selected avatar to automatically generate and automatically send a message to the content recommendation server, the generated message comprising information associated with electronic feedback provided by the user respective to the avatar;

determining, by the content recommendation server, a health level of the selected avatar based on the generated message received by the content recommendation server, the health level of the selected avatar indicative of an amount of the feedback of the user;

further updating, via the content recommendation server, the user model based on the health level; and communicating, via the content recommendation server, digital content to the user based on the further updated user model.

17. The medium of claim 16, further comprising monitoring user feedback to content retrieved via standing search queries generated from whitelisted terms;

providing contextual messages to the user via the avatar based on user feedback; and updating the standing search queries based on user response to the contextual messages.

18. The medium of claim 16, further comprising:

selecting a health level of the avatar based at least on amount of interaction of the user with the user model.

* * * * *